(12) United States Patent
Watanabe

(10) Patent No.: US 7,409,075 B2
(45) Date of Patent: Aug. 5, 2008

(54) IMAGE PROCESSING APPARATUS AND METHOD, PROGRAM, AND RECORDING MEDIUM

(75) Inventor: Yoshinori Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 700 days.

(21) Appl. No.: 10/765,859

(22) Filed: Jan. 29, 2004

(65) Prior Publication Data
US 2004/0252861 A1 Dec. 16, 2004

(30) Foreign Application Priority Data
Feb. 14, 2003 (JP) ............................. 2003-037325

(51) Int. Cl.
*G06K 9/00* (2006.01)
(52) U.S. Cl. .................. 382/103; 382/181; 382/199; 382/154; 382/107; 707/6; 707/7; 707/8; 707/9; 345/154; 375/240.16; 348/416
(58) Field of Classification Search ............ 382/103, 382/181, 199, 154, 107; 707/6–10; 375/240.16; 356/27; 73/488; 348/416; 345/154
See application file for complete search history.

(56) References Cited

U.S. PATENT DOCUMENTS

| | | | | |
|---|---|---|---|---|
| 5,019,975 A * | 5/1991 | Mukai | ............................ | 707/7 |
| 6,021,221 A * | 2/2000 | Takaha | ........................ | 382/199 |
| 6,026,217 A * | 2/2000 | Adiletta | ...................... | 709/247 |
| 6,473,198 B1 * | 10/2002 | Matama | ....................... | 358/1.9 |
| 6,674,902 B1 * | 1/2004 | Kondo et al. | ................ | 382/199 |
| 6,690,825 B1 * | 2/2004 | Nakayama | ................... | 382/190 |
| 6,731,799 B1 * | 5/2004 | Sun et al. | ..................... | 382/173 |
| 6,873,723 B1 * | 3/2005 | Aucsmith et al. | ............ | 382/154 |
| 6,934,414 B2 * | 8/2005 | Kondo et al. | ................ | 382/199 |
| 6,999,599 B2 * | 2/2006 | Rui et al. | ..................... | 382/103 |
| 7,043,058 B2 * | 5/2006 | Cornog et al. | ............. | 382/107 |
| 7,123,745 B1 * | 10/2006 | Lee | ............................. | 382/103 |
| 7,164,784 B2 * | 1/2007 | Beardsley | ................... | 382/154 |

(Continued)

FOREIGN PATENT DOCUMENTS

JP 9-322170 12/1997

(Continued)

OTHER PUBLICATIONS

A Video Object Generation Tool Allowing Friendly User Interaction, Zanoguera et al.*

*Primary Examiner*—Andrew W. Johns
*Assistant Examiner*—Nancy Bitar
(74) *Attorney, Agent, or Firm*—Oblon, Spivak, McClelland, Maier & Neustadt, P.C.

(57) ABSTRACT

In each of frames of specified image data, a covered background area or an uncovered background area is detected. In an image in the first frame, a user inputs the contour of an object in the covered background area. In an image in the last frame, the user inputs the contour of the object in the uncovered background area. On the basis of the contour of the object, which is input in the image in the first frame, the frames are played in the forward direction to extract the object. At the same time, on the basis of the contour of the object, which is input in the image in the last frame, the frames are played in the backward direction to extract the object.

12 Claims, 30 Drawing Sheets

U.S. PATENT DOCUMENTS

| | | | |
|---|---|---|---|
| 7,213,061 B1 * | 5/2007 | Hite et al. | 709/223 |
| 7,224,366 B2 * | 5/2007 | Kessler et al. | 345/473 |
| 2002/0030739 A1 * | 3/2002 | Nagaya et al. | 348/143 |
| 2007/0165952 A1 * | 7/2007 | Goto | 382/199 |

FOREIGN PATENT DOCUMENTS

| | | |
|---|---|---|
| JP | 2002-44519 | 2/2002 |
| JP | 2002-56393 | 2/2002 |

* cited by examiner

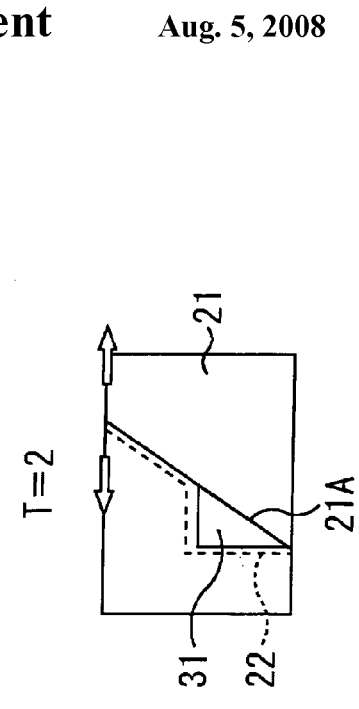
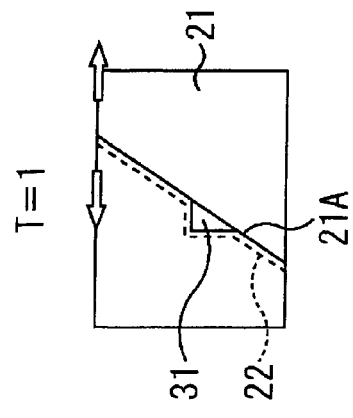
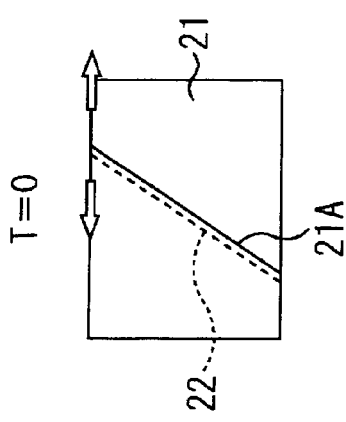
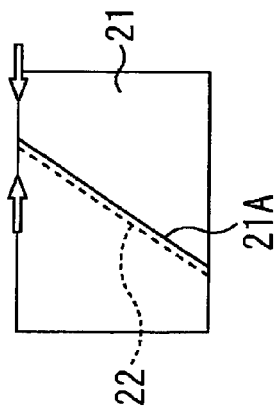
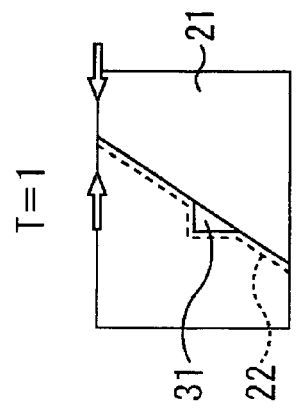
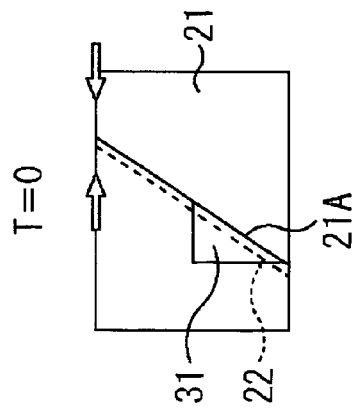

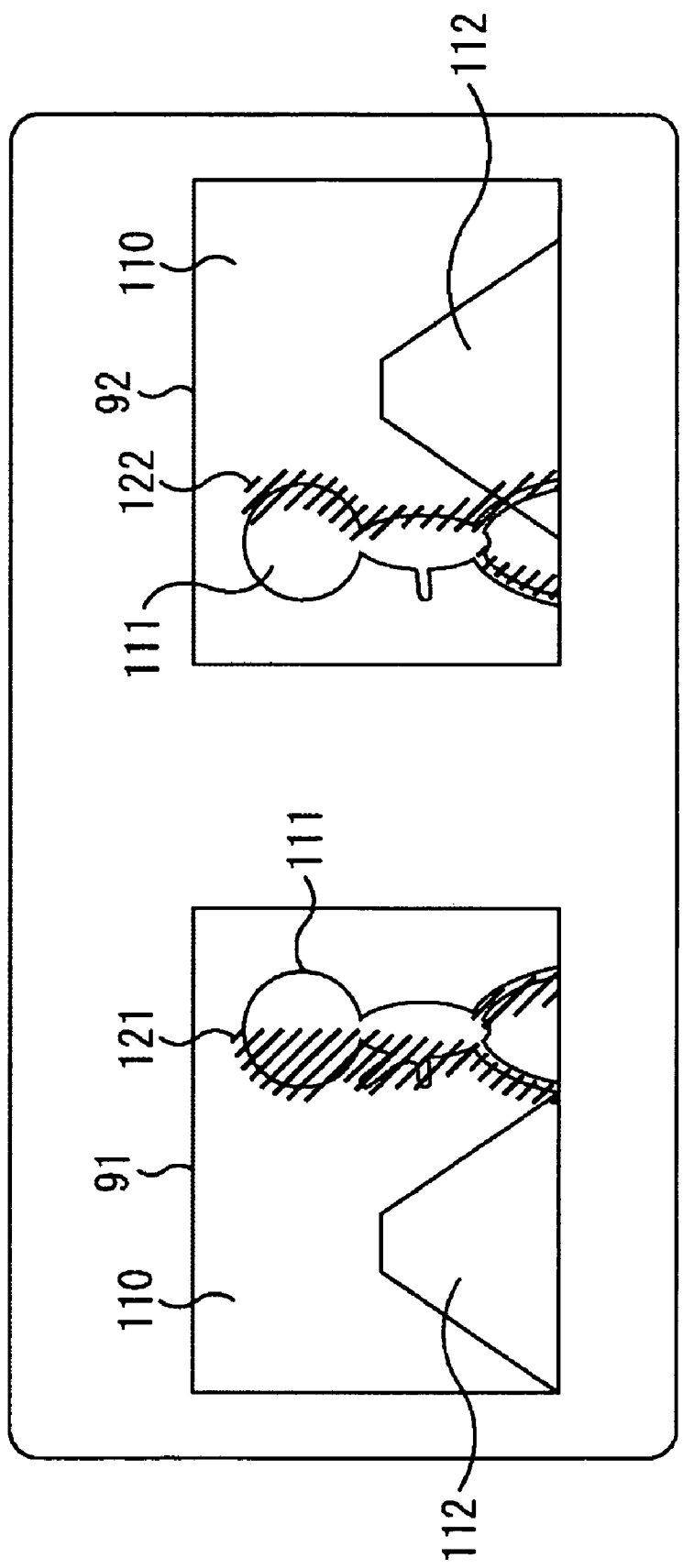

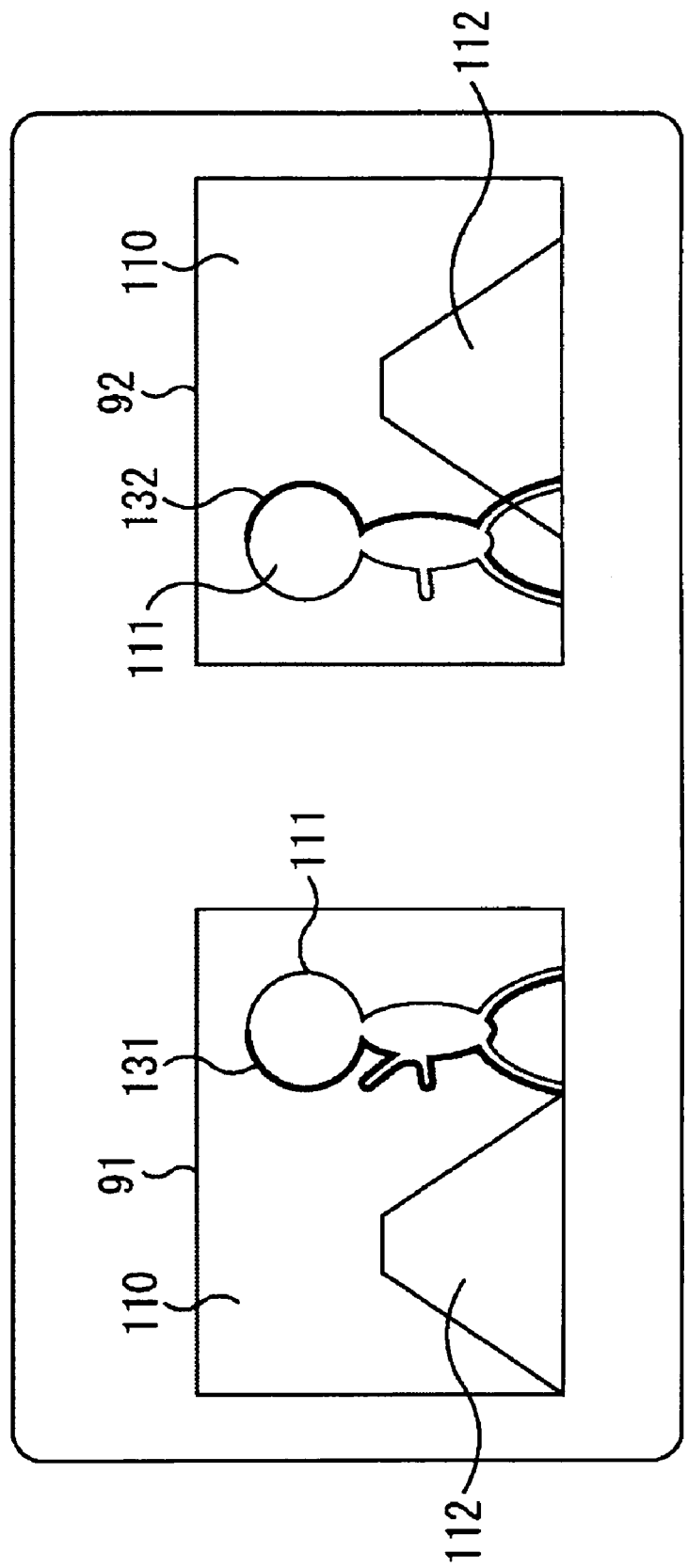

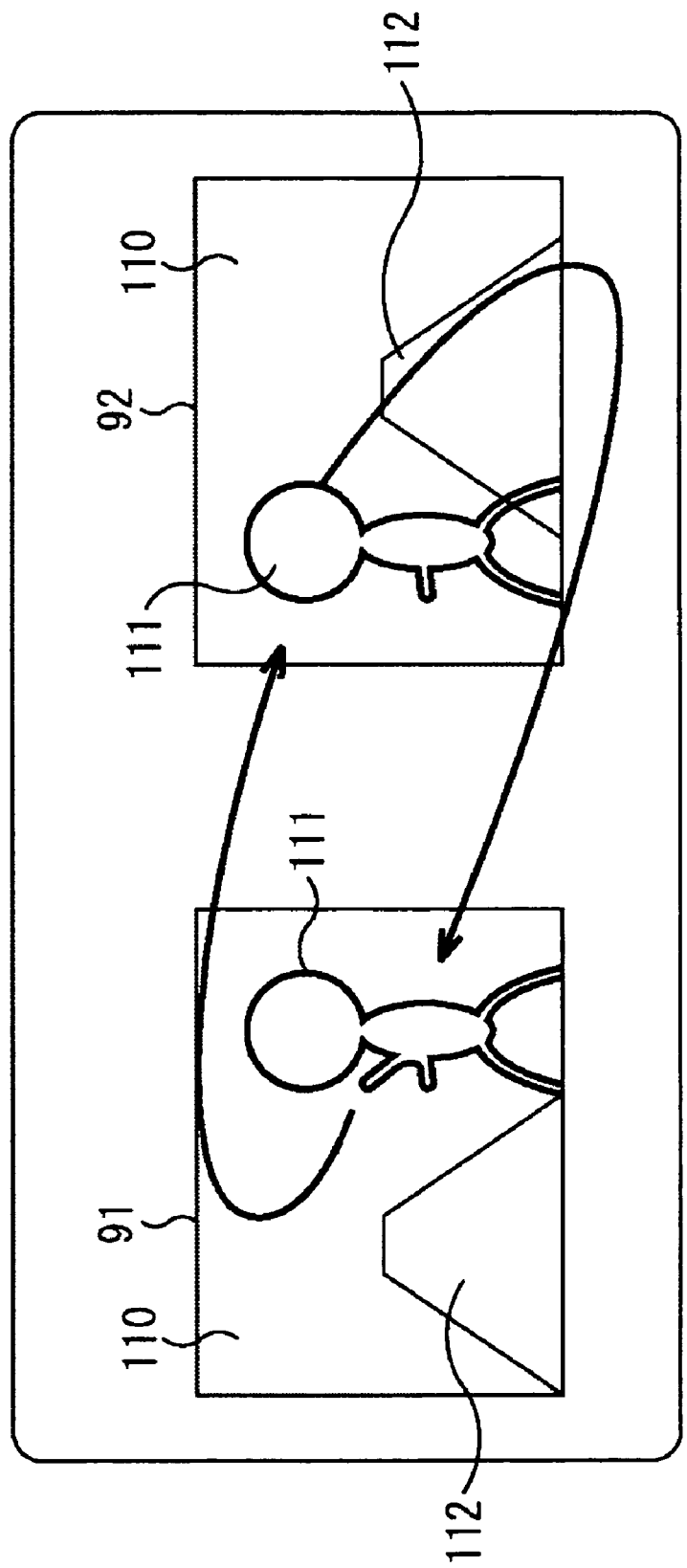

IMAGE PROCESSING APPARATUS AND METHOD, PROGRAM, AND RECORDING MEDIUM

BACKGROUND OF THE INVENTION

1. Field of the Invention

The present invention relates to image processing apparatuses and methods, programs, and recording media, and more particularly relates to an image processing apparatus and method, a program, and a recording medium for enabling a user to extract the contour of a desired object.

2. Description of the Related Art

A technology has been developed in which a user specifies a desired object and inputs the contour of the object in the first frame of moving image data, thereby extracting the contour of the object in subsequent successive frames and cutting out the desired object (e.g., see Japanese Unexamined Patent Application Publication H10-269369).

FIGS. 1A to 1E illustrate an example of displayed moving image data consisting of successive frames 0 to 40. FIG. 1A shows an image in frame 0 in which a triangular object 1 is displayed. FIG. 1B shows an image in frame 10 in which the object 1 moves slightly to the right, compared with the state in frame 0. FIGS. 1C to 1E show images in frames 20, 30, and 40, respectively, in which the object 1 moves slightly further to the right.

Referring to FIG. 1A, a user specifies the overall contour of the triangular object 1 displayed on an image processing apparatus by tracing the contour with a pen (not shown), which results in a line 2. In subsequent successive frames, the object 1 is tracked on the basis of the contour specified by the user as the line 2, thereby detecting the contour of the object 1 in each of the images in the corresponding frames. The contour is indicated by bold lines in FIGS. 1B to 1E.

Referring to FIG. 1E, the user may specify the contour of the object 1, and the image processing apparatus may track the object 1 in preceding successive frames in order of FIGS. 1D, 1C, 1B, and 1A, thereby detecting the contour.

According to such background art, as indicated by lines 2a of FIGS. 1B to 1D, the contour of an object may be erroneously detected while tracking the object.

SUMMARY OF THE INVENTION

In view of the foregoing circumstances, it is an object of the present invention to detect the contour of an object more accurately.

An image processing apparatus according to an aspect of the present invention includes an image obtaining unit for obtaining image data of a specified image; a motion analyzer for analyzing the motion of an object included in the image on the basis of the image data obtained by the image obtaining unit; an image presenting unit for presenting an image in a frame in which the object to be extracted from the image is specified; a contour input accepting unit for accepting the input of the contour of the object to be extracted from the image in the frame, which is presented by the image presenting unit, on the basis of the analysis result obtained by the motion analyzer; and an object extracting unit for extracting the object in images in a plurality of frames on the basis of the contour of the object, the input of which is accepted by the contour input accepting unit.

The motion analyzer may include a motion computing unit for computing the motion of the object in the image relative to the background; and an area determining unit for determining an extraction area in which the contour of the object in the image is to be extracted on the basis of the motion computed by the motion computing unit. The contour input accepting unit may accept the contour input in the extraction area determined by the area determining unit.

The image presenting unit may display the extraction area determined by the area determining unit.

The motion computing unit may include a distance computing unit for setting a plurality of feature points in the image and computing the distance between the adjacent feature points.

The area determining unit may include a comparison unit for comparing the distance between the adjacent feature points in a temporally prior frame with the distance between the adjacent feature points in a temporally subsequent frame, the distances being computed by the motion computing unit; and a setting unit for setting, on the basis of the comparison result obtained by the comparison unit, in the background of the image, a first area that is gradually covered by the object and a second area that gradually changes from being covered to being non-covered by the object.

The object extracting unit may extract the object in a plurality of frames temporally subsequent to the frame in which the input of the contour of the object is accepted by the contour input accepting unit. The image presenting unit may display the first area serving as the extraction area.

The object extracting unit may extract the object in a plurality of frames temporally prior to the frame in which the input of the contour of the object is accepted by the contour input accepting unit. The image presenting unit may display the second area serving as the extraction area.

The image processing apparatus may further include an object displaying unit for displaying the object extracted by the object extracting unit.

An image processing method according to another aspect of the present invention includes an image obtaining step of obtaining image data of a specified image; a motion analyzing step of analyzing the motion of an object included in the image on the basis of the image data obtained in the image obtaining step; an image presenting step of presenting an image in a frame in which the object to be extracted from the image is specified; a contour input accepting step of accepting the input of the contour of the object to be extracted from the image in the frame, which is presented in the image presenting step, on the basis of the result obtained in the motion analyzing step; and an object extracting step of extracting the object in images in a plurality of frames on the basis of the contour of the object, the input of which is accepted in the contour input accepting step.

A program according to another aspect of the present invention causes a computer to perform a process including an image obtaining control step of controlling the obtaining of image data of a specified image; a motion analysis control step of controlling analysis of the motion of an object included in the image on the basis of the image data obtained in the image obtaining control step; an image presenting control step of controlling the presenting of an image in a frame in which the object to be extracted from the image is specified; a contour input accepting control step of controlling the accepting of the input of the contour of the object to be extracted from the image in the frame, which is presented in the image presenting control step, on the basis of the result obtained in the motion analysis control step; and an object extraction control step of controlling extraction of the object in images in a plurality of frames on the basis of the contour of the object, the input of which is accepted in the contour input accepting control step.

A recording medium according to another aspect of the present invention has recorded thereon a program for causing a computer to perform a process including an image obtaining control step of controlling the obtaining of image data of a specified image; a motion analysis control step of controlling analysis of the motion of an object included in the image on the basis of the image data obtained in the image obtaining control step; an image presenting control step of controlling the presenting of an image in a frame in which the object to be extracted from the image is specified; a contour input accepting control step of controlling the accepting of the input of the contour of the object to be extracted from the image in the frame, which is presented in the image presenting control step, on the basis of the result obtained in the motion analysis control step; and an object extraction control step of controlling extraction of the object in images in a plurality of frames on the basis of the contour of the object, the input of which is accepted in the contour input accepting control step.

According to an image processing apparatus and method and a program of the present invention, image data of a specified image is obtained. On the basis of the obtained image data, the motion of an object included in the image is analyzed. An image in a frame in which the object to be extracted from the image is specified is presented. The contour of the object to be extracted from the presented image in the frame is input. On the basis of the contour of the object, the input of which is accepted, the object in images in a plurality of frames is extracted.

According to the present invention, an object can be extracted stably with higher accuracy.

BRIEF DESCRIPTION OF THE DRAWINGS

FIGS. 5A to 5F are illustrations of examples of a covered background and an uncovered background;

FIG. 6 is an illustration of examples of displayed images in frames in which a user must input the contour;

FIG. 7 is an illustration of an example of the contour input in the images shown in FIG. 6;

FIG. 8 is an illustration of an example in which the contour is extracted on the basis of the images shown in FIG. 7;

DESCRIPTION OF THE PREFERRED EMBODIMENTS

Figure 1:
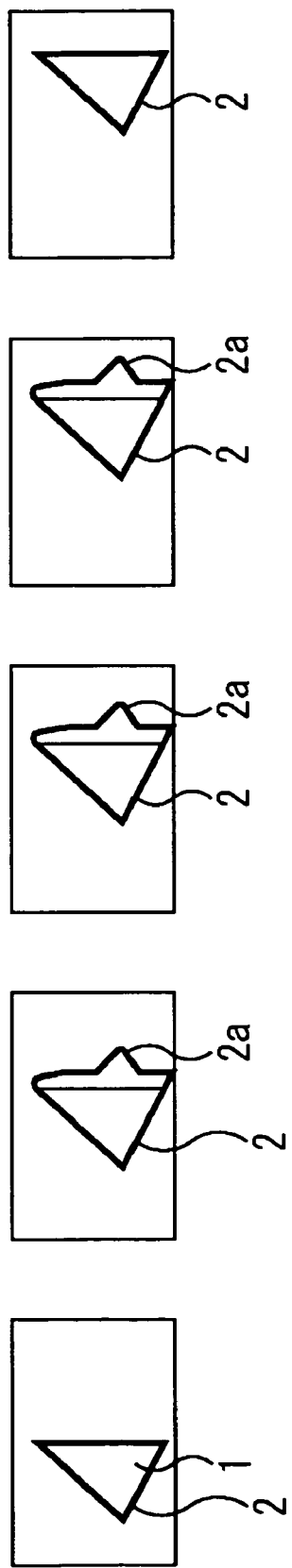
FIGS. 1A to 1E are illustrations showing an example of a known object detecting method.
Figure 2:
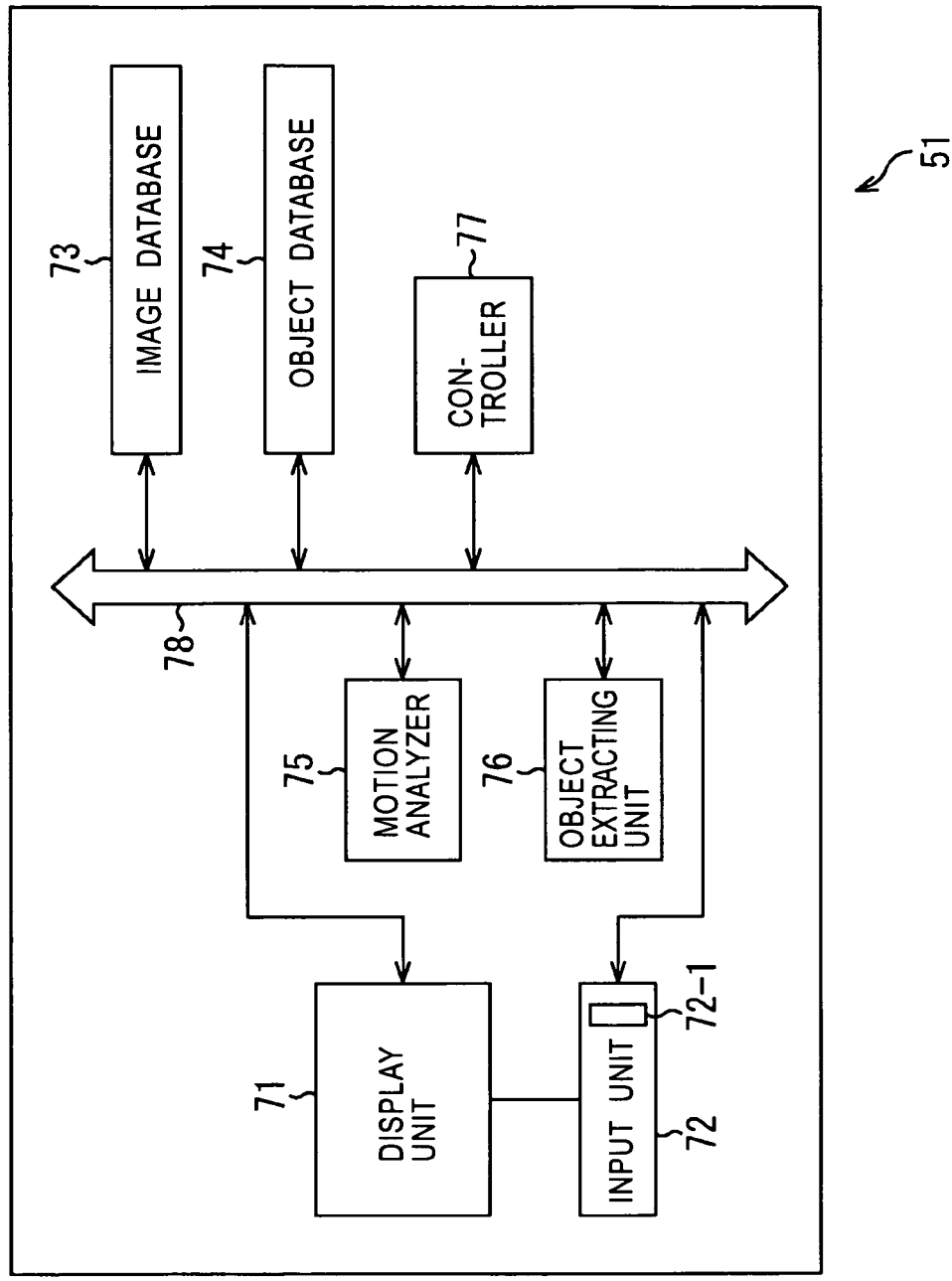
FIG. 2 is a block diagram of an example of the structure of an image processing apparatus according to the present invention.

FIG. 2 is a block diagram of an example of the structure of an image processing apparatus according to the present invention. In this example, an image processing apparatus 51 is provided with a display unit 71 that displays an image and an input unit 72 that receives control input from a user. The user operates operation buttons (not shown) disposed on the input unit 72 to give an instruction to start playing image data or to start an object extracting process, which will be described later. The input unit 72 is provided with a touch pen 72-1. With this touch pen 72-1, the user traces the contour of a desired object in an image displayed on the display unit 71, thereby inputting the contour of the object.

The information processing apparatus 51 is further provided with an image database 73 that accumulates image data, a motion analyzer 75 that analyzes the motion of an image, and an object extracting unit 76 that extracts an object on the basis of the contour of the object, which is input by the user. The information processing apparatus 51 is further provided with an object database 74 that records data of the object extracted by the object extracting unit 76. The above-described components are interconnected by a bus 78 and controlled by a controller 77 that controls these components.

Figure 3:
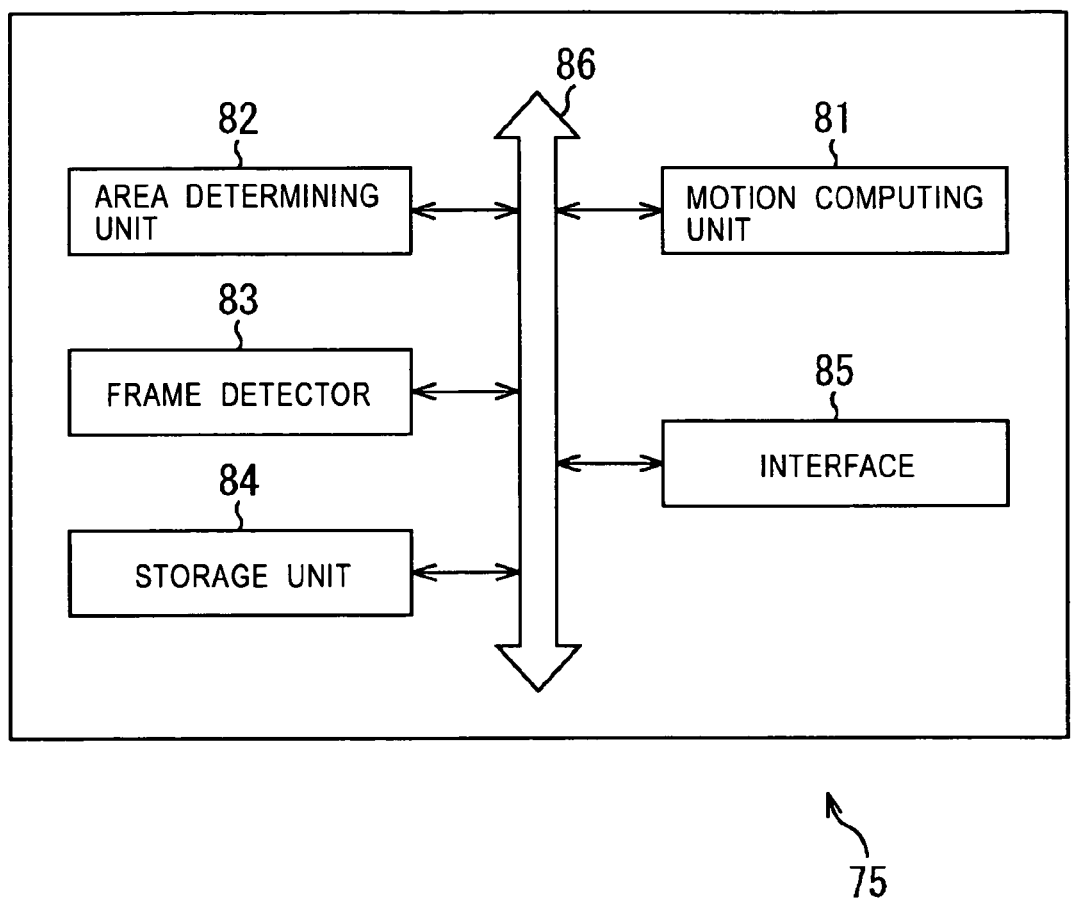
FIG. 3 is a block diagram of an example of the structure of a motion analyzer shown in FIG. 2.

FIG. 3 is a block diagram of an example of the internal structure of the motion analyzer 75. The motion analyzer 75 includes a motion computing unit 81 that computes the distance between adjacent feature points in a predetermined area in an image in each frame and an area determining unit 82 that detects, on the basis of the processing result obtained by the motion computing unit 81, a covered background area or an uncovered background area in the image. The covered background area and the uncovered background area are described later.

The motion analyzer 75 further includes a frame detector 83 that detects a frame into which the user must input the contour and controls display in a portion in which the user must input the contour in an image in the detected frame, a storage unit 84 that stores the processing results obtained by the motion computing unit 81, the area determining unit 82, and the frame detector 83, and an interface 85 that controls connections with the bus 78. The components of the motion analyzer 75 are interconnected by a bus 86.

Referring to the flowchart of FIG. 4, the object extracting process will now be described.

In step S1, the controller 77 determines whether a user has given an instruction to start the process. The controller 77 is queued until it is determined that the user has given such an instruction. To give an instruction to start the object extracting process, the user operates the input unit 72 to specify, of moving image data accumulated in the image database 73, the type of moving image data to be processed (e.g., moving image data file A) and a portion of this moving image data in which an object is to be extracted (e.g., from frame 0 (start point) to frame 50 (end point)), thereby giving an instruction to start the process.

When it is determined in step S1 that the instruction to start the process is given, in step S2, the controller 77 reads moving image data within a range defined by the specified start and end points from the image database 73. In this example, frames 0 to 50 are read from the moving image data file A.

In step S3, the controller 77 causes the motion analyzer 75 to perform a motion analyzing process described with reference to FIG. 10 on the moving image data read in step S2. Of the moving image, the motion of the object relative to the background is analyzed, and an area in which the user must input the contour is detected. To enable the user to detect an area in which the user must input the contour of the object, a covered background area or an uncovered background area is detected.

FIGS. 5A to 5F are illustrations of examples of the covered background and the uncovered background.

FIGS. 5A to 5C illustrate images in temporally successive frames T (T=0, 1, and 2) of particular moving image data. Of these images, the larger the value of T (the more temporally subsequent the frame), the more an object 21 moves to the right relative to the background. As the object 21 moves to the right relative to the background, an object 31 that has been hidden behind the object 21 appears in the image. Referring to FIG. 5A (image in frame 0), the object 31 is behind the object 21 and thus not displayed. Referring to FIG. 5B (image in frame 1), the object 21 moves to the right, and hence an upper left portion of the object 31 is displayed on the right side of the middle section of a contour 21A of the object 21. Referring to FIG. 5C (image in frame 2), the object 21 moves further to the right, and a larger upper left portion of the object 31 is displayed.

A background that has been hidden behind an object and that is gradually displayed as this object moves is referred to as an uncovered background. Generally in an area in which this uncovered background is detected, the contour of an object is hard to detect accurately by an image processing apparatus. Referring to FIGS. 5A to 5C, a dotted line 22 represents the contour of the object 21, which is detected by the image processing apparatus. Referring to FIG. 5A (image in frame 0), the dotted line 22 also represents the contour of the object 21, which is input by the user.

In frame 0, the image processing apparatus extracts the contour of the object 21 on the basis of the dotted line 22 of the object 21, which is input by the user. When another object is detected in the vicinity of the contour 21A of the object 21, the image processing apparatus may erroneously detect the contour of the object 21. For example, in frame 1, the upper left portion of the object 31 behind the object 21 is erroneously detected as the contour of the object 21. In frame 2, the larger portion of the object 31 is displayed, and hence the detected contour (dotted line 22) is further deviated from the contour 21A of the object 21.

In such an area in which the uncovered background is detected, once the contour of an object is detected erroneously, it is highly likely that the contour of the object be detected erroneously in subsequent successive frames. When the contour of the object, which is input by the user, is accepted in this area, the contour of the object may not be accurately detected in the subsequent successive frames.

FIGS. 5D to 5F illustrate images in temporally successive frames T (T=0, 1, and 2) of particular moving image data. Of these images, the larger the value of T (the more temporally subsequent the frame), the further the object 21 moves to the left relative to the background. As the object 21 moves further to the left relative to the background, the other object 31, which has been in the background of the object 21, becomes gradually hidden behind the object 21 and disappears from the image. Referring to FIG. 5D (image in frame 0), a large portion of the object 31, which is behind and on the left side of the object 21, is displayed. Referring to FIG. 5E (image in frame 1), the object 21 moves to the left. As a result, a lower right portion of the object 31 becomes hidden behind the object 21, and a small upper left portion of the object. 31 is displayed on the left side of the middle section of the contour 21A of the object 21. Referring to FIG. 5F (image in frame 2), the object 21 moves further to the left, and the object 31 becomes completely hidden behind the object 21 and is not displayed.

A background that is gradually hidden behind an object and then disappears as the object moves is referred to as a covered background. Generally in an area in which this covered background is detected, the contour of the object is relatively easy to detect accurately. Referring to FIGS. 5D to 5F, the dotted line 22 represents the contour of the object 21, which is detected by the image processing apparatus. Referring to FIG. 5D (image in frame 0), the dotted line 22 also represents the contour of the object 21, which is input by the user.

In frame 0 shown in FIG. 5D, the image processing apparatus extracts the contour of the object 21 on the basis of the dotted line 22 input by the user. In frame 1 shown in FIG. 5E, an upper left portion of the other object 31, which is in the background of the object 21, is detected erroneously as the contour of the object 21. However, in frame 2 shown in FIG. 5F, the object 31 is hidden behind the object 21 and disappears. The detected contour (dotted line 22) approximately coincides with the contour 21A of the object 21.

In such an area in which the covered background is detected, even when the contour of an object is detected erroneously, it is less likely that the contour of the object be detected erroneously in subsequent successive frames. When the contour of the object, which is input by the user, is accepted in this covered background area, it becomes more likely that the contour of the object be accurately detected in the subsequent successive frames.

To play frames of a moving image in the backward (or forward) direction, an uncovered background becomes a covered background by playing these frames in the forward (or backward) direction (i.e., playing the frames in the opposite direction). For example, the background shown in FIGS. 5A to 5C becomes an uncovered background by playing the frames in the order: frame 0, frame 1, and frame 2. In contrast, this background becomes a covered background, as in FIGS. 5D to 5F, by playing the frames in the order: frame 2, frame 1, and frame 0.

In other words, in an area in which a covered background is detected, the contour of the object, which is input by the user, is accepted in a temporally prior frame, and frames of the moving image are played in the forward direction to detect the contour of the object. In contrast, in an area in which an uncovered background is detected, the contour of the object, which is input by the user, is accepted in a temporally subsequent frame, and frames of the moving image are played in the backward direction to detect the contour of the object. Accordingly, the contour of the object is detected accurately.

Referring back to FIG. 4, in step S4, the controller 77 displays an image in a frame in which the user must input the contour on the display unit 71. In step S5, the controller 77 accepts the contour input by the user.

FIG. 6 illustrates an image 91 in the first frame and an image 92 in the last frame of a moving image. In this moving image, a person (object) 111 serving as a foreground moves to the left relative to a background 110. In the image 91 in the first frame, a mountain 112 in the background 110 is on the left side of the person 111. Since the person 111 moves to the left relative to the background 110, the mountain 112 in the background 110 is on the right side of the person 111 in the last frame 92.

In the case of this moving image, as described above, the right side of the mountain 112 is a covered background when the person 111 begins to move in front of mountain 112 from the right, whereas the left side of mountain 112 is an uncovered background when the person 111 moves to the left of mountain 112. In step S4, the controller 77 displays the image 91 and the image 92 in the frames shown in FIG. 6 on the display unit 71. In the image 91, a left portion of the person 111 (portion 121 indicated by oblique lines) and, in the image 92, a right portion of the person 111 (portion 122 indicated by oblique lines) are, for example, highlighted in red to prompt the user to input the contour.

In step S5, the user traces the contour on the display unit 71 with the touch pen 72-1, thereby inputting the contour of the object to be extracted (person 111). Referring to FIG. 7, in the image 91, the contour is input as a bold line 131 in the left portion 121 of the person 111, and, in the image 92, the contour is input as a bold line 132 in the right portion 122 of the person 111. In other words, instead of inputting the contour surrounding the entire person 111, the user inputs half of the contour in each of the first and last frames.

In step S6, the controller 77 causes the object extracting unit 76 to track the contour in the forward direction in the covered background area. In step S7, the controller 77 causes the object extracting unit 76 to track the contour in the backward direction in the uncovered background area. In other words, referring to FIG. 8, the contour of the left portion of the person 111 is extracted in the forward direction on the basis of the contour input in the image 91 (bold line 131 of FIG. 7), and the contour of the right portion of the person 111 is extracted in the backward direction on the basis of the contour input in the image 92 (bold line 132 of FIG. 7).

Figure 9:
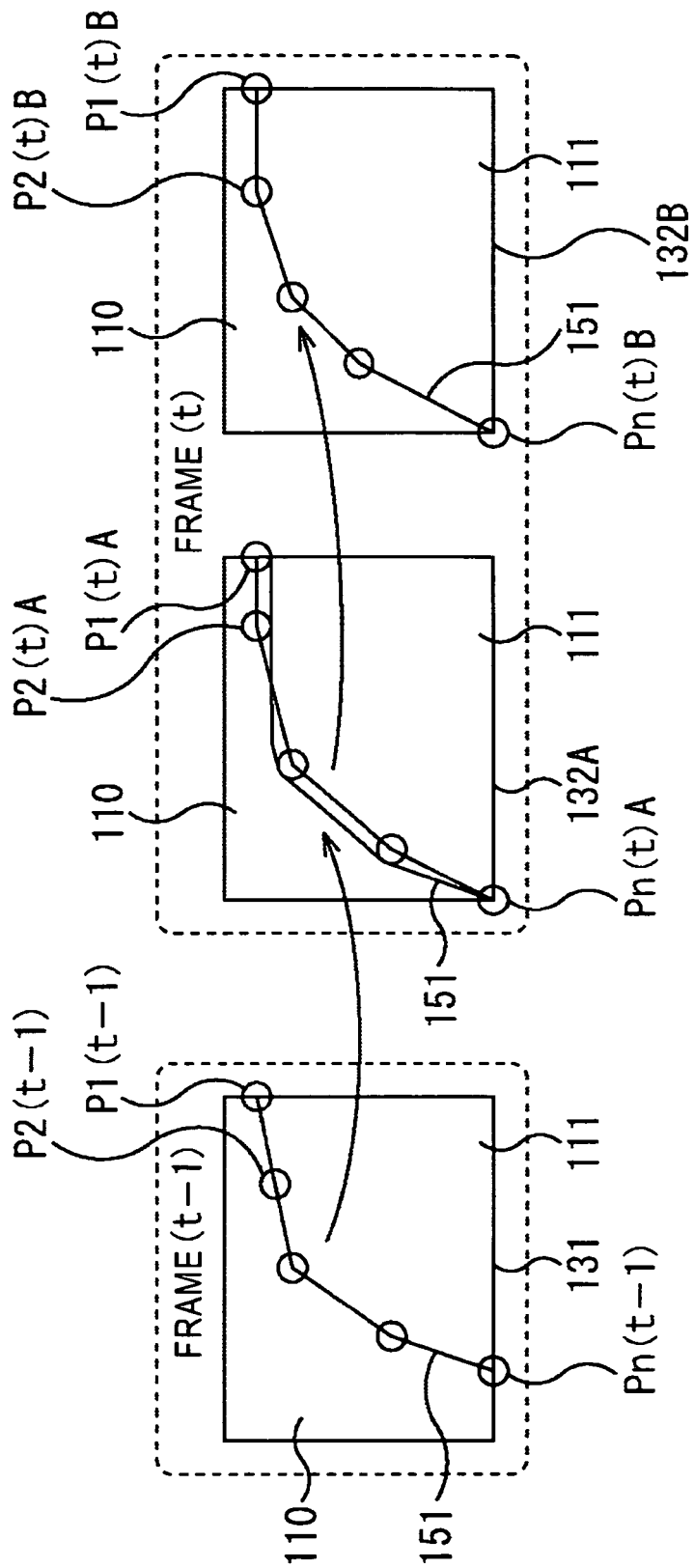
FIG. 9 is an illustration of an enlarged portion of the contour of an object to be extracted.

FIG. 9 shows the manner in which the contour of the object is extracted. An image 131 shows part of the contour of the person 111 in frame (t-1). An image 132A shows part of the contour of the person 111 in frame (t), which is one frame subsequent to frame (t-1). An image 132b is an image generated by correcting the image 132A.

In the image 131, tracing points Pq(t-1), P2(t-1), ... Pn(t-1) are set on a contour 151 of the person 111. Using a method such as a block matching algorithm, the motion of the image is detected to track the tracing points in frame (t) one frame subsequent to frame (t-1). Tracing points P1(t)A, P2(t)A, ... Pn(t)A in the image 132A are obtained by tracking, and these tracing points P1(t)A, P2(t)A, Pn(t)A correspond to the tracing points P1(t-1), P2(t-2), ... Pn(t-1), respectively.

In steps S6 and S7, the border between the object and the background is extracted by a snake to deal with changes in the shape of the object to be tracked and extracted. The snake is an energy function expressed as:

$$E_{snake} = \int_0^1 -E_{image}(v(s)) + E_{int}(v(s))ds \quad (1)$$

$$E_{image} = \left(\sum (I_i - \text{Mean}(v(s)))\right)^{\frac{1}{2}} \quad (2)$$

$$E_{int} = \alpha(s)|v_s(s)|^2 \quad (3)$$

$$= |v(s) - v(s-1)|^2$$

$$= (x(s) - x(s-1))^2 + (y(s) - y(s-1))^2$$

where $I_i$ is the computed feature level of a target pixel, $E_{image}$ is standard deviation of the feature levels of pixels around the target pixel, and $E_{int}$ is the square of distance of the difference vector of the border between the object and the background.

The border between the object and the background is obtained by selecting $V(s)=(x(s), y(s))$ so that the value of the energy function $E_{snake}$ is minimized.

In the image 132A, the border between the person 111 and the background is obtained by the snake. As shown in the image 132B, new tracing points P1(t)B, P2(t)B, ... Pn(t)B are set on the border. A line connecting these tracing points P1(t)B, P2(t)B, ... Pn(t)B is extracted as the contour of the person 111.

Although the contour of the object is extracted by block matching and the snake in this example, the contour of the object may be extracted by another method.

Image data of the extracted object, in conjunction with information for specifying this object, is stored in the object database 74 where necessary.

Figure 4:
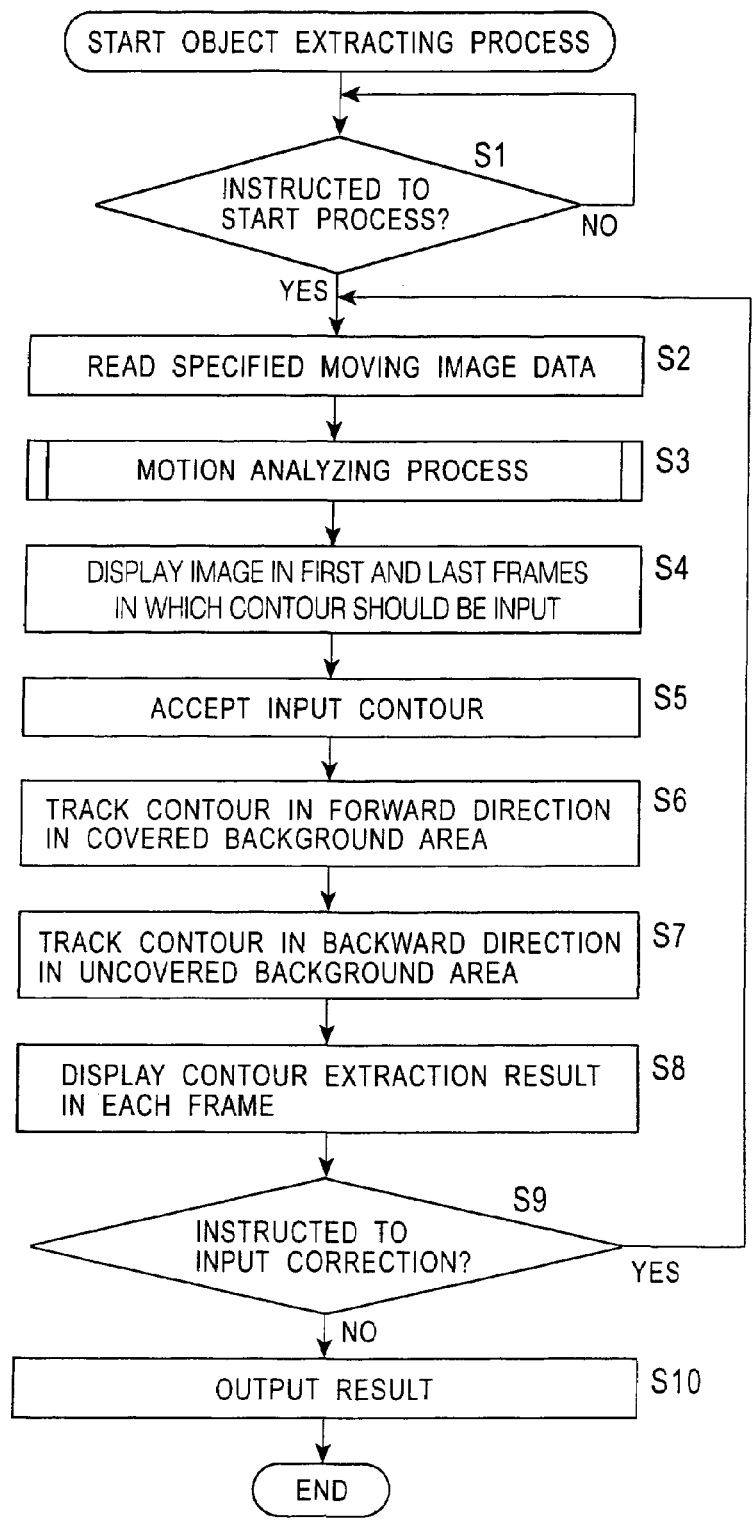
FIG. 4 is a flowchart showing an object extracting process.

In step S8 of FIG. 4, the controller 77 displays the extraction result in each frame on the display unit 71. For example, assuming that the image 91 of FIG. 8 is an image in frame 0 and the image 92 is an image in frame 50, the controller 77 sequentially displays images in frame 0, frame 1, frame 2, ... frame 50 every time a predetermined button of the input unit 72 is pressed.

In step S8, the user may give an instruction to input correction based on the displayed image. For example, when the user determines that, of the displayed images in frames 0 to 50, the contour is erroneously extracted in frames 30 to 40, the user gives an instruction to input correction by specifying frames 30 and 40 as new start and end points, respectively.

In step S9, the controller 77 determines whether the user has given an instruction to input correction. When it is determined that the user has given an instruction to input correction, the controller 77 returns to step S2, and the process from step S2 onward is repeated. In this case, frame 30 serves as the first frame and frame 40 serves as the last frame; and the processing in steps S2 to S8 described above is performed.

Accordingly, the user observes, for example, of the moving image shown in FIGS. 1A to 1E, frame 10 (FIG. 1B), frame 20 (FIG. 1C), and frame 30 (FIG. 1D) as images in which the contour of the object is erroneously detected, specifies the first frame (FIG. 1B) in which the contour of the object is erroneously detected as the start point and the last frame (FIG. 1D) in which the contour of the object is erroneously detected as the end point, and inputs correction. As a result, the contour of the object is extracted more accurately.

When it is determined in step S9 that the user has given no instruction to input correction, that is, when it is determined that the user has determined that there are no frames to be corrected, in step S10, the controller 77 displays the extracted contour of the object as, for example, a white line, outputs the entire moving image (frames 0 to 50 in this case) to the display unit 71, and displays the entire moving image on the display unit 71.

Accordingly, the user-desired object is extracted.

Figure 10:
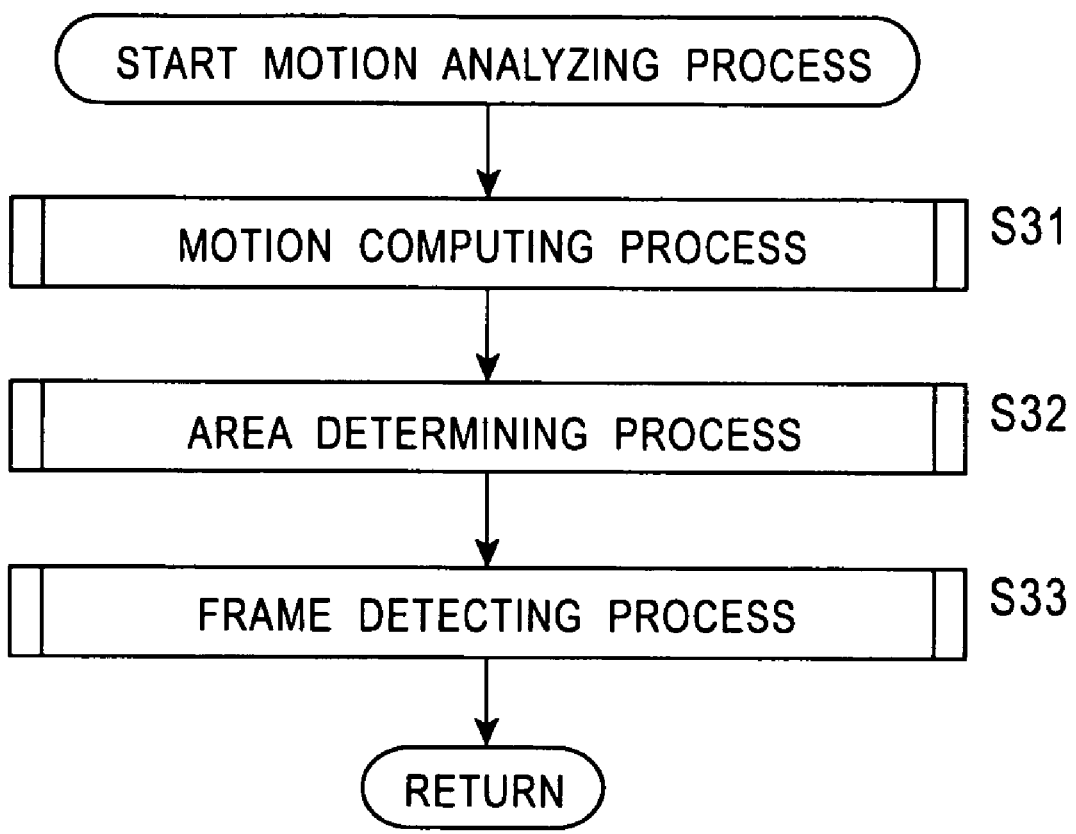
FIG. 10 is a flowchart showing a motion analyzing process.

Referring to FIG. 10, the motion analyzing process in step S3 of FIG. 4 will now be described. This process is executed by the motion analyzer 75. In step S31, the motion computing unit 81 of the motion analyzer 75 performs a motion computing process, which will be described later with reference to FIG. 11. Accordingly, the distances between the tracing points set on the object and the tracing points set on the background are computed.

In step S32, the area determining unit 82 of the motion analyzer 75 performs an area determining process, which will be described later with reference to FIG. 13. Accordingly, a covered background area and an uncovered background area are set in each frame. In step S33, the frame detector 83 of the motion analyzer 75 performs a frame detecting process, which will be described later with reference to FIG. 14. Accordingly, in step S4 of FIG. 4, a frame to be displayed as a frame in which the contour must be input is detected, and a portion in which the contour must be input in an image in that frame is highlighted.

Figure 11:
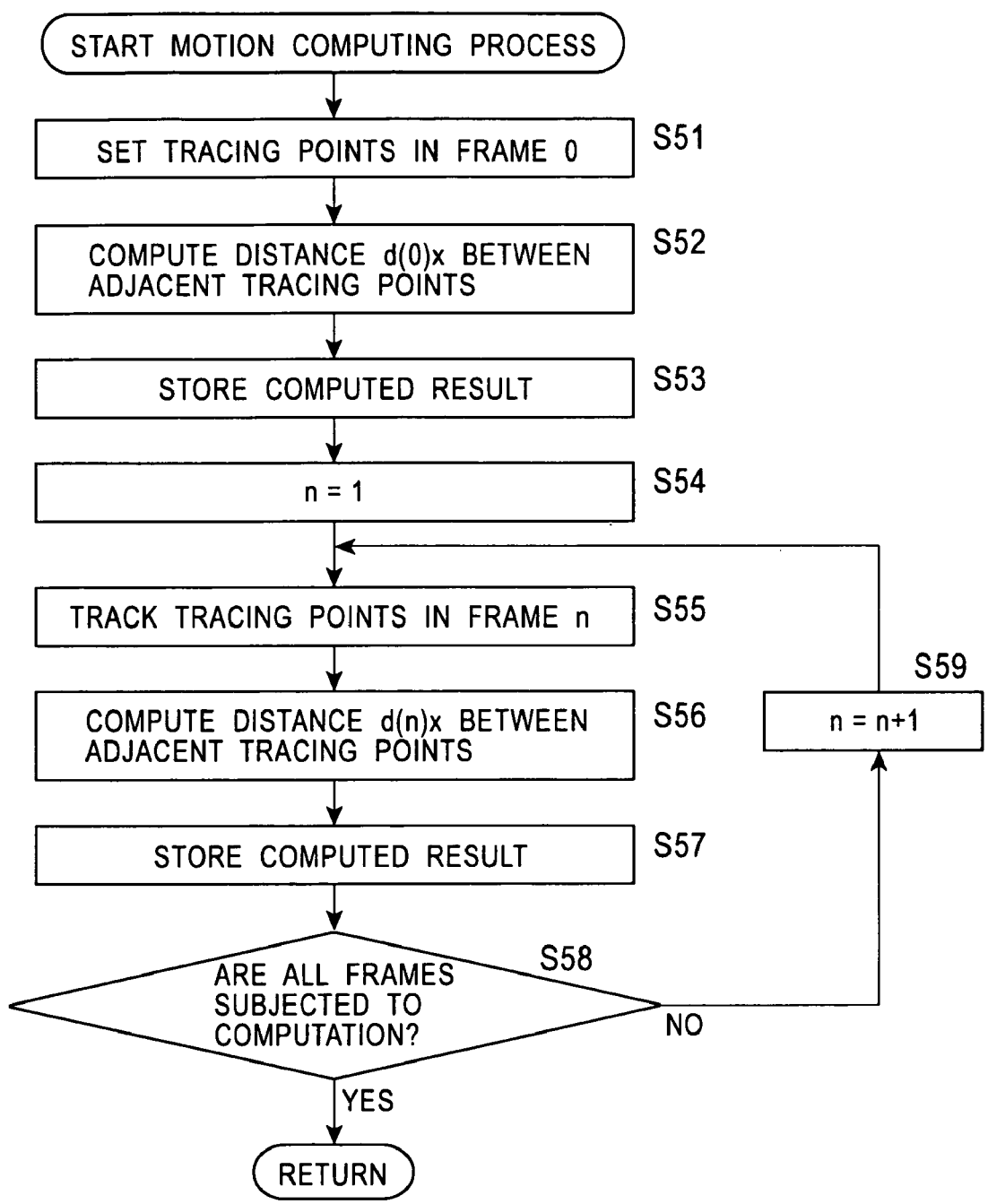
FIG. 11 is a flowchart showing a motion computing process.

Referring to FIG. 11, the motion computing process in step S31 of FIG. 10 will now be described. In step S51, the motion computing unit 81 sets tracing points in frame 0. In step S52, the motion computing unit 81 computes the distance d(0)x between the adjacent tracing points.

Figure 12:
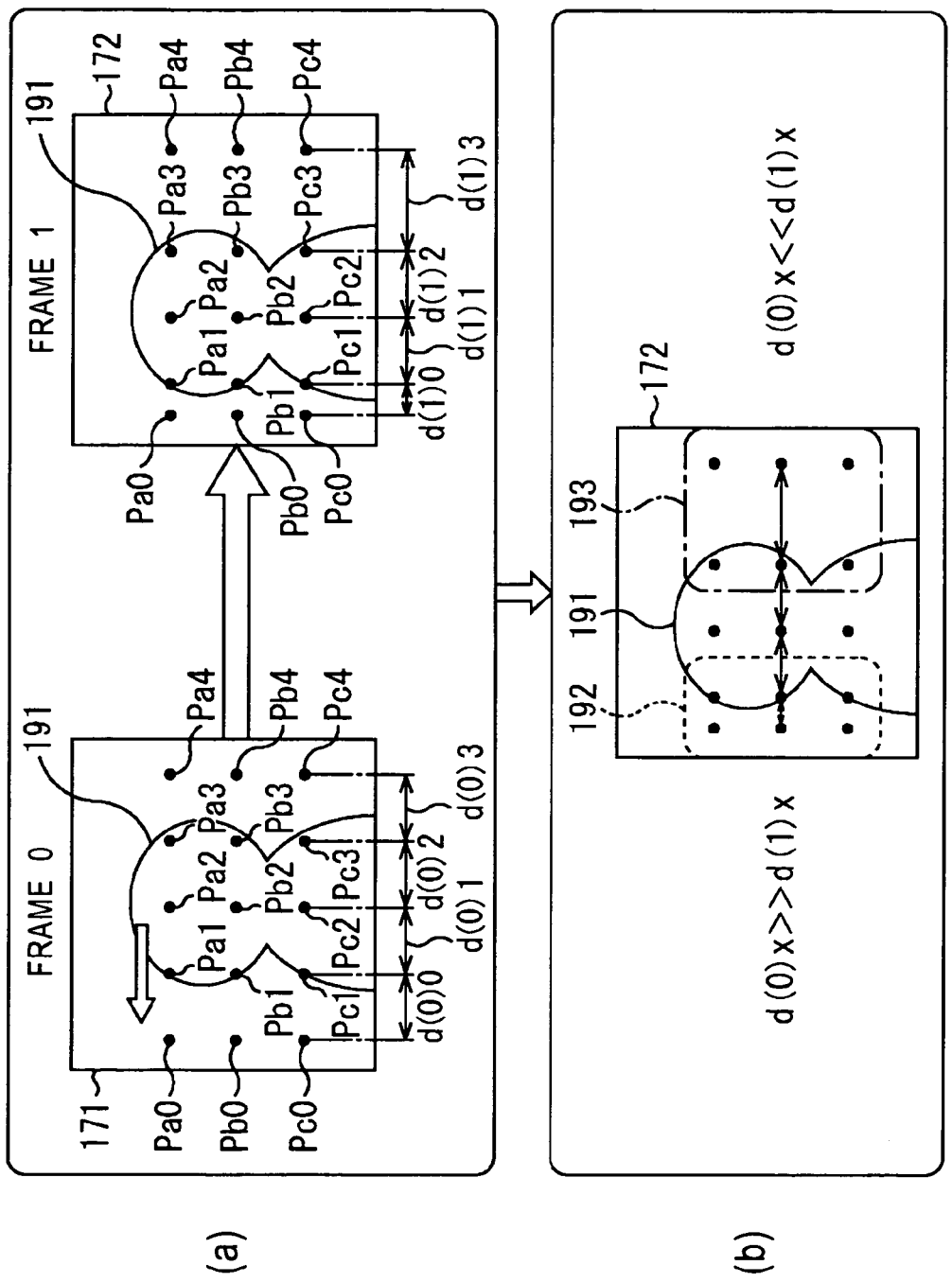
FIG. 12 includes illustrations of examples of tracing points set by the motion analyzing process.

For example, referring to portion (a) of FIG. 12, tracing points Pa1 to Pc4 are set at arbitrary positions in an image 171 in frame 0. In a case in which an object 191 to be extracted is displayed, of these tracing points Pa1 to Pc4, the three tracing points Pa1, Pa2, and Pa3 are located in the upper portion of the object 191; the tracing points Pb1 to Pb3 are located in the middle portion of the object 191; and the tracing points Pc1 to Pc3 are located in the lower portion of the object 191. The tracing points Pa0, Pb0, and Pc0 are located in the background on the left side of the object 191, whereas the tracing points Pa4, Pb4, and Pc4 are located in the background on the right side of the object 191.

The distance d0(0) between the tracing points Pa1 and Pa0 is computed. In the example shown in portion (a) of FIG. 12, the distance between the tracing points Pb0 and Pb1 and the distance between the tracing points Pc0 and Pc1 are set to be equal to the distance d(0)0 between the tracing points Pa1 and Pa0. When these values differ, the distance between each two adjacent tracing points is computed individually.

Similarly, the distance d(0)1 between the tracing points Pa1 and Pa2 (Pb1 and Pb2, and Pc1 and Pc2), the distance d(0)2 between the tracing points Pa2 and Pa3 (Pb2 and Pb3, and Pc2 and Pc3), and the distance d(0)3 between the tracing points Pa3 and Pa4 (Pb3 and Pb4, and Pc3 and Pc4) are computed.

When the tracing points are located equidistant from one another, as shown in portion (a) of FIG. 12, only one distance is computed. More specifically, the tracing points are located at positions specified by the motion computing unit 81, and hence the motion computing unit 81 is only required to read the values of the tracing points to compute the distance.

In step S53, the motion computing unit 81 stores the computation results, that is, the distances d(0)0 to d(0)3, in the storage unit 84.

In step S54, the motion computing unit 81 sets the variable n to one. In step S55, the motion computing unit 81 tracks the tracing points in frame n. In step S56, the motion computing unit 81 computes the distance d(n)x between the adjacent tracing points.

Specifically, the tracing points Pa0 to Pc4 set in the image 171 in frame 0 are also tracked as tracing points Pa0 to Pc4 in an image 172 in the subsequent frame (frame 1). The tracing points are tracked by the block matching algorithm or the like. Since the object 191 moves leftward in the diagram, of the tracing points, the nine tracing points Pa1 to Pc3 located on the object 191 move leftward in the diagram in frame 1. In contrast, the three tracing points Pa0 to Pc0 located in the background on the left side of the object 191 and the three tracing points Pa4 to Pc4 located in the background on the right side of the object 191 remain stationary.

In the image 172, the distances d(1)0, d(1)1, d(1)2, and d(1)3 between the adjacent tracing points are computed.

In step S57, the motion computing unit 81 stores the computation results, that is, the distances d(1)0 to d(1)3, in the storage unit 84.

In step S58, the motion computing unit 81 determines whether the distances between the adjacent tracing points have been computed in all frames. If the determination is negative, in step S59, the motion computing unit 81 increments the value of n by one, returns to step S55, and repeatedly performs processing from step S55 onward.

When it is determined in step S58 that the distances between the adjacent tracing points are computed in all frames, the motion computing process is terminated.

Accordingly, the distance between each two adjacent tracing points is computed in each frame and is stored.

Figure 13:
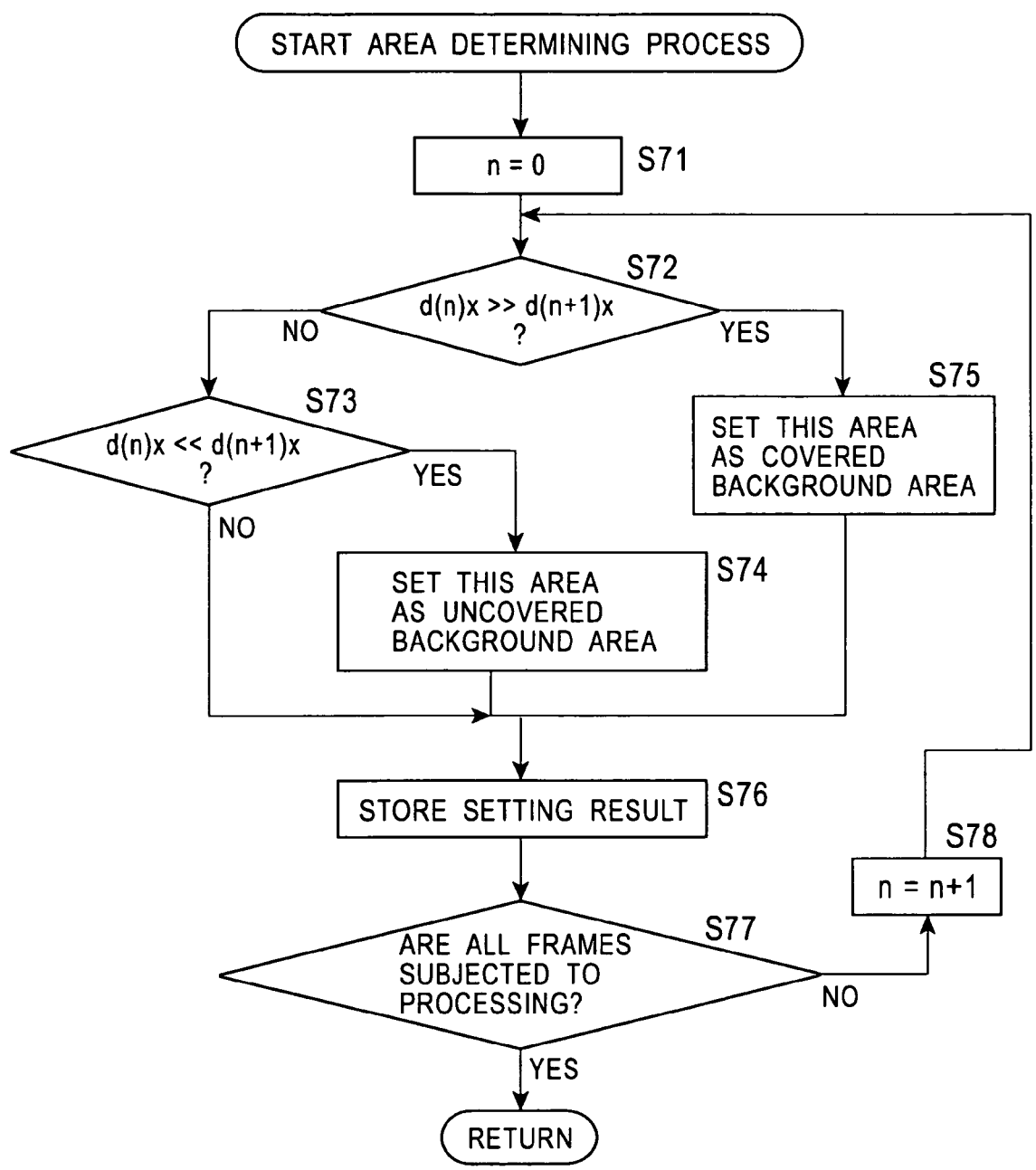
FIG. 13 is a flowchart showing an area determining process.

Referring to FIG. 13, the area determining process in step S32 of FIG. 10 will now be described. In step S71, the area determining unit 82 sets the variable n to zero. In step S72, the area determining unit 82 reads, from the storage unit 84, the distance d(n)x between the adjacent tracing points in frame n and the distance d(n+1)x between the corresponding tracing points in frame (n+1), compares these values, and determines whether the condition d(n)x>>d(n+1)x is satisfied, where ">>" is a symbol indicating that the value on the left side is much larger than the value on the right side. For example, when the difference between the distance d(n)x and the distance d(n+1)x is greater than or equal to a predetermined reference value, it is determined that the condition d(n)x>>d(n+1)x is satisfied.

When it is determined in step S72 that the condition d(n)x>>d(n+1)x is satisfied, in step S75, the area determining unit 82 sets this area as a covered background area.

When it is determined in step S72 that the d(n)x >>d(n+1)x is not satisfied, in step S73, the area determining unit 82 determines whether the condition d(n)x<<d(n+1)x is satisfied. When it is determined in step S73 that the condition d(n)x<<d(n+1)x is satisfied, in step S74, the area determining unit 82 sets this area as an uncovered background area.

For example, when the variable n is 0, the distance d(0)0 between the tracing points in the image 171 in frame 0 (frame n) shown in portion (a) of FIG. 12 is compared with the distance d(1)0 between the corresponding tracing points in the image 172 in frame 1 (frame (n+1)), thereby determining whether the condition d(0)0 >>d(1)0 is satisfied.

The object 191 to be extracted is displayed substantially at the center in the image 171 in frame 0. However, the object 191 moves slightly to the left in the image 172 in frame 1. Since each of the distances d(0)0 and d(1) is the distance between the tracing point Pa0, Pb0, or Pc0 located in the background on the left side of the object 191 and the tracing point Pa1, Pb1, or Pc1 located in the vicinity of the contour of the left portion of the object 191, in step S72, it is determined that the distance d(0)0 between the tracing points in frame 0 is much larger than the distance d(1)0 between the tracing points in frame 1 (the condition d(0)0>>d(1)0 is satisfied).

In this case, in step S75, the area determining unit 82 sets an area in the vicinity of the tracing point Pa0, Pb0, or Pc0 and the tracing point Pa1, Pb1, or Pc1 as a covered background area 192, as shown in portion (b) of FIG. 12.

Similarly, the distance d(0)1 is compared with the distance d(1)1, thereby determining whether the condition d(0)1>>d(1)1 is satisfied. Similarly, the distance d(0)2 is compared with the distance d(1)2, and the distance d(0)3 is compared with the distance d(1)3, thereby determining, as in the case of the above-described distance d(0)0 and the distance d(1)0, whether the condition is satisfied. In this example, it is determined that the condition d(n)x>>d(n+1)x is satisfied only when the distance d(0)0 is compared with the distance d(0)1.

In contrast, in step S73, as described above, it is determined whether the condition d(n)x<<d(n+1)x is satisfied. In other words, the distance d(0)0 is compared with the distance d(1)0, thereby determining whether the condition d(0)0<<d(1)0 is satisfied. The distance d(0)1 and the distance d(1)1, the distance d(0)2 and the distance d(1)2, and the distance d(0)3 and the distance d(1)3 are compared with each other, thereby determining, as in the case of the distance d(0)0 and the distance d(1)0, whether the condition is satisfied. In this example, it is determined that the condition d(n)x<<d(n+1)x is satisfied only when the distance d(0)3 is compared with the distance d(1)3.

Specifically, since each of the distances d(0)3 and d(1)3 is the distance between the tracing point Pa4, Pb4, or Pc4 located in the background on the right side of the object 191 and the tracing point Pa3, Pb3, or Pc3 located in the vicinity of the contour of the right portion of the object 191, the distance d(1)3 becomes greater than the distance d(0)3 as the object 191 moves to the left. In step S73, it is determined that the distance d(1)3 between the tracing points in frame 1 is much larger than the distance d(0)3 between the tracing points in frame 0 (the condition d(0)0<<d(1)0 is satisfied).

In this case, in step S74, the area determining unit 82 sets an area in the vicinity of the tracing point Pa3, Pb3, or Pc3 and the tracing point Pa4, Pb4, or Pc4 as an uncovered background area 193, as shown in portion (b) of FIG. 12.

Referring back to FIG. 13, after the processing in step S74 or S75 or when it is determined in step S73 that the condition d(n)x<<d(n+1)x is not satisfied, in step S76, the area determining unit 82 stores the setting result in the storage unit 84. In step S77, the area determining unit 82 determines whether all frames have been processed. When the determination is negative, in step S78, the area determining unit 82 increments the value of n by one and returns to step S72, and the processing from step S72 onward is repeated.

When it is determined in step S77 that all frames have been processed, the area determining process is terminated.

As described above, a covered background area or an uncovered background area is detected in each frame, and an area is set in accordance with the detection.

Figure 14:
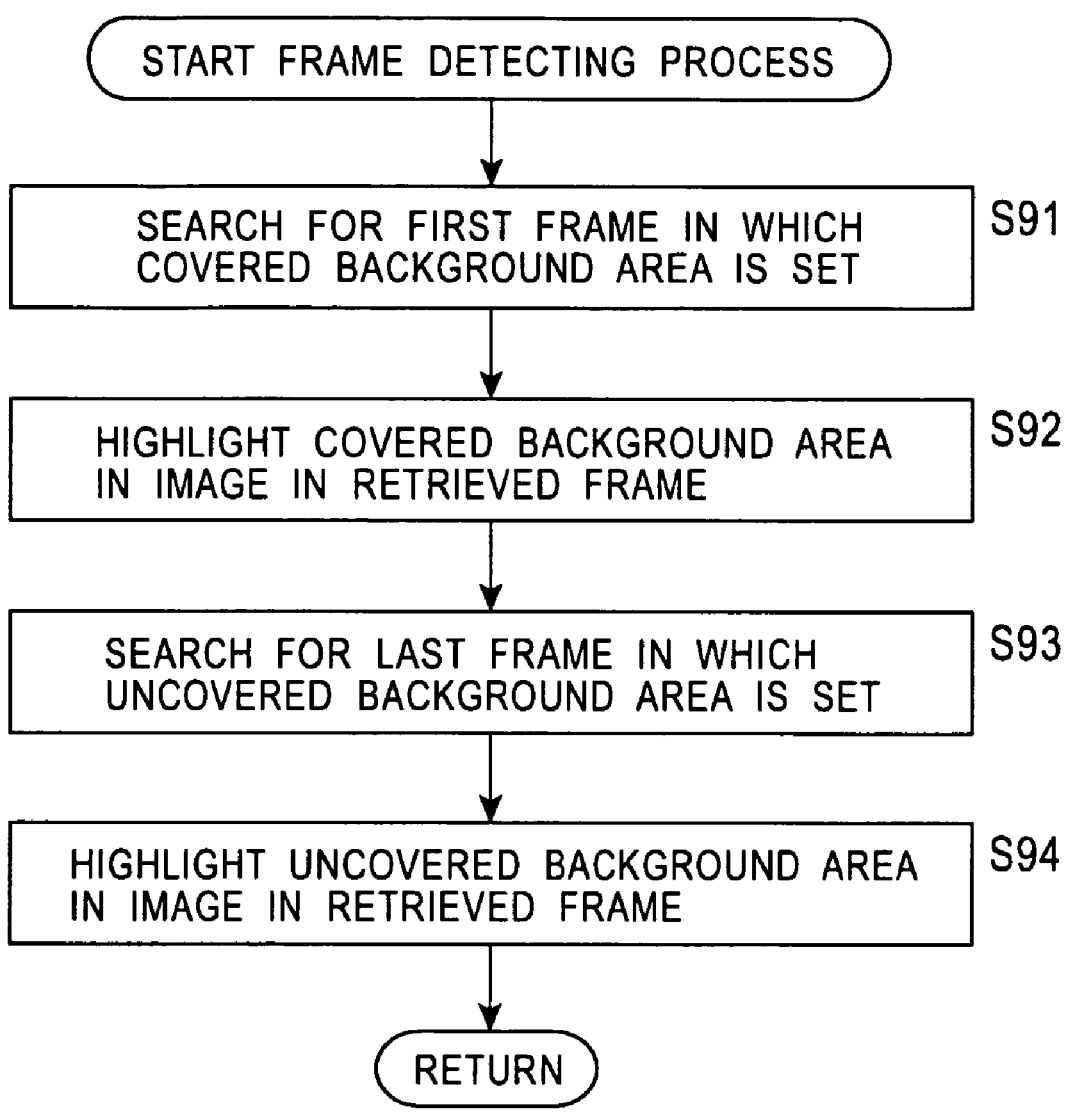
FIG. 14 is a flowchart showing a frame detecting process.

Referring to FIG. 14, the frame detecting process in step S33 of FIG. 10 will now be described. In step S91, the frame detector 83 searches for the first frame in which the covered background area is set. As described above, in the covered background area, the contour of the object, which is input by the user, is accepted in a temporally prior frame, and frames of the moving object are played in the forward direction to extract the contour of the object. As a result, the contour of the object is extracted more accurately.

In step S92, the frame detector 83 highlights the covered background area in the image in the first frame in which the covered background area is set.

In step S93, the frame detector 83 searches for the last frame in which the uncovered background area is set. As described above, in the uncovered background area, the contour of the object, which is input by the user, is accepted in a temporally subsequent frame, and frames of the moving image data are played in the backward direction to extract the contour of the object. As a result, the contour of the object is extracted more accurately.

In step S94, the frame detector 83 highlights the uncovered background area in the image in the last frame in which the uncovered background area is set.

As a result, in step S4 of FIG. 4, the images in the frames in which the areas are set are displayed, as shown in FIG. 6.

Figure 15:
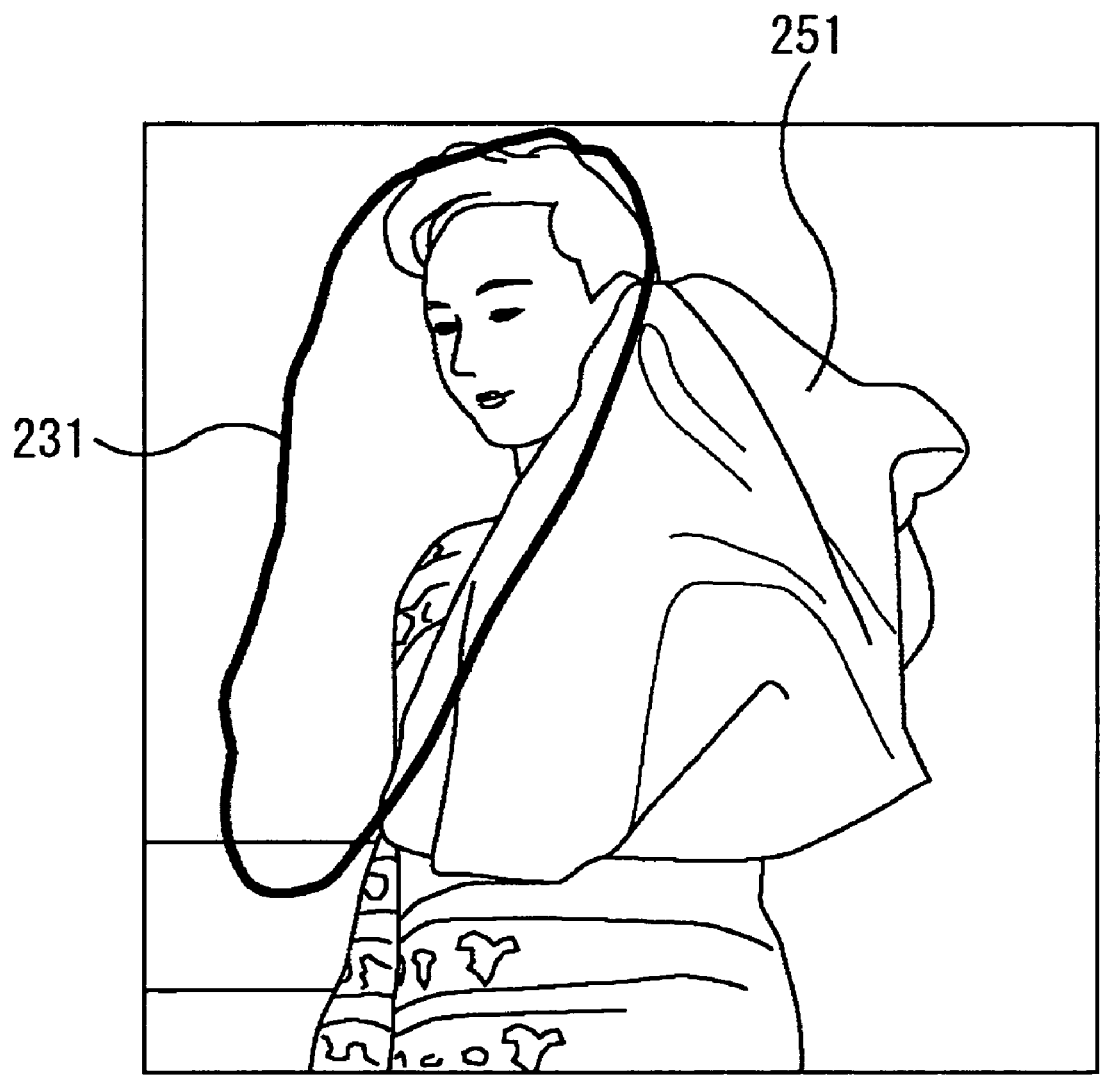
FIG. 15 is an illustration of an example of a displayed image in a frame in which the user must input the contour according to the present invention.
Figure 16:
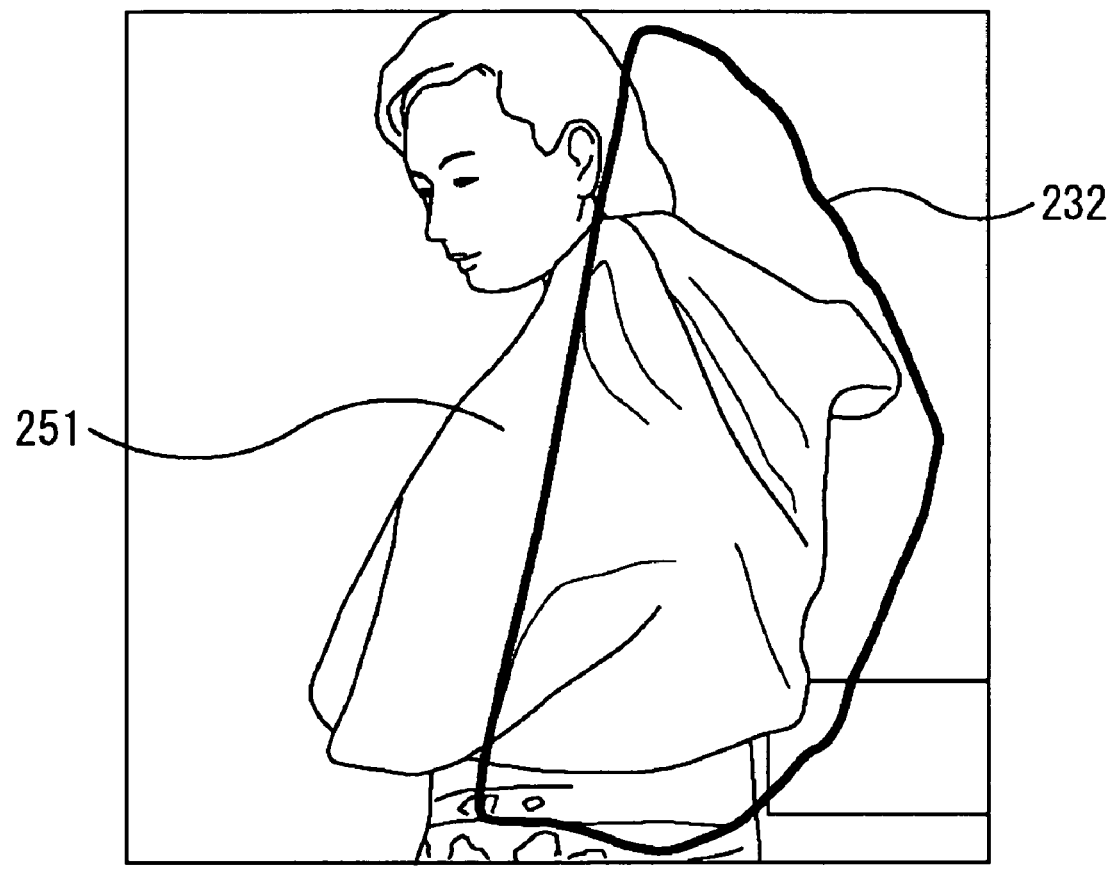
FIG. 16 is an illustration of an example of a displayed image in a frame in which the user must input the contour according to the present invention.

FIGS. 15 and 16 illustrate other examples of the first frame (FIG. 15) and the last frame (FIG. 16) displayed in the foregoing manner. FIGS. 15 and 16 show images in the first frame (frame 0) and the last frame (frame 50), respectively, of moving image data consisting of frames 0 to 50 generated by capturing a moving image of a woman with a scarf 251 walking to the left. In this moving image, the scarf 251 is extracted as an object by displaying, for example, a predetermined portion 231 in the vicinity of the left portion of the scarf 251, serving as a covered background area, in highlight in red on the display unit 71, thereby prompting the user to input the contour.

In an image in frame 50 shown in FIG. 16, a predetermined portion 232 in the vicinity of the right portion of the scarf 251, serving as an uncovered background area, is, for example, highlighted in red on the display unit 71, thereby prompting the user to input the contour.

The portions 231 and 232 in which the user must input the contour may not necessarily be highlighted in red. Alternatively, the portions 231 and 232 may be indicated by flashing light, or lines representing the contours of the portions 231 and 232 may be displayed, thereby prompting the user to input the contour. Needless to say, areas in which the user is prohibited from inputting the contour may be displayed, thereby prompting the user to input the contour in unprohibited areas. As shown in FIGS. 15 and 16, it is preferable in terms of user-friendliness to display areas in which the user must input the contour.

Figure 17:
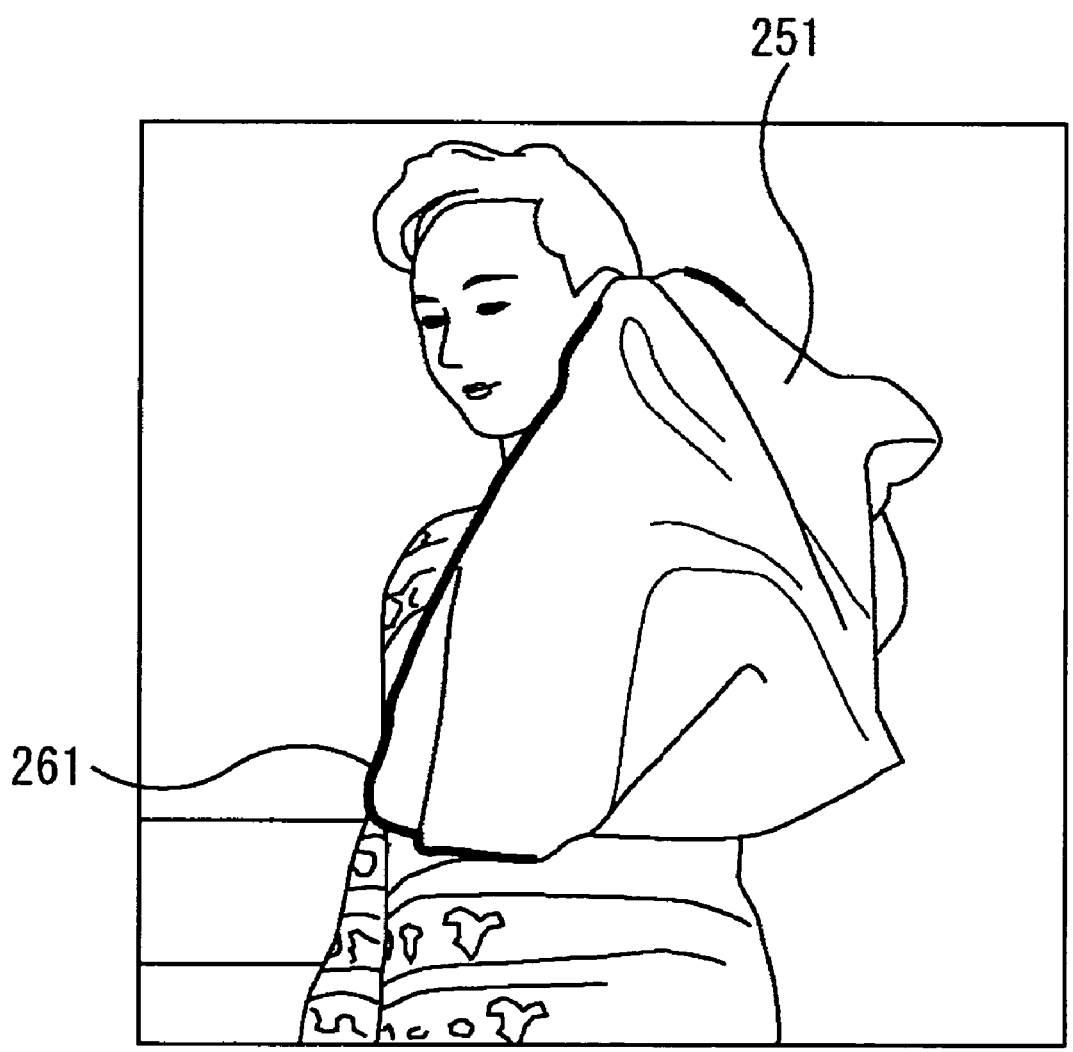
FIG. 17 is an illustration of an example in which the user inputs the contour in the image of FIG. 15.
Figure 18:
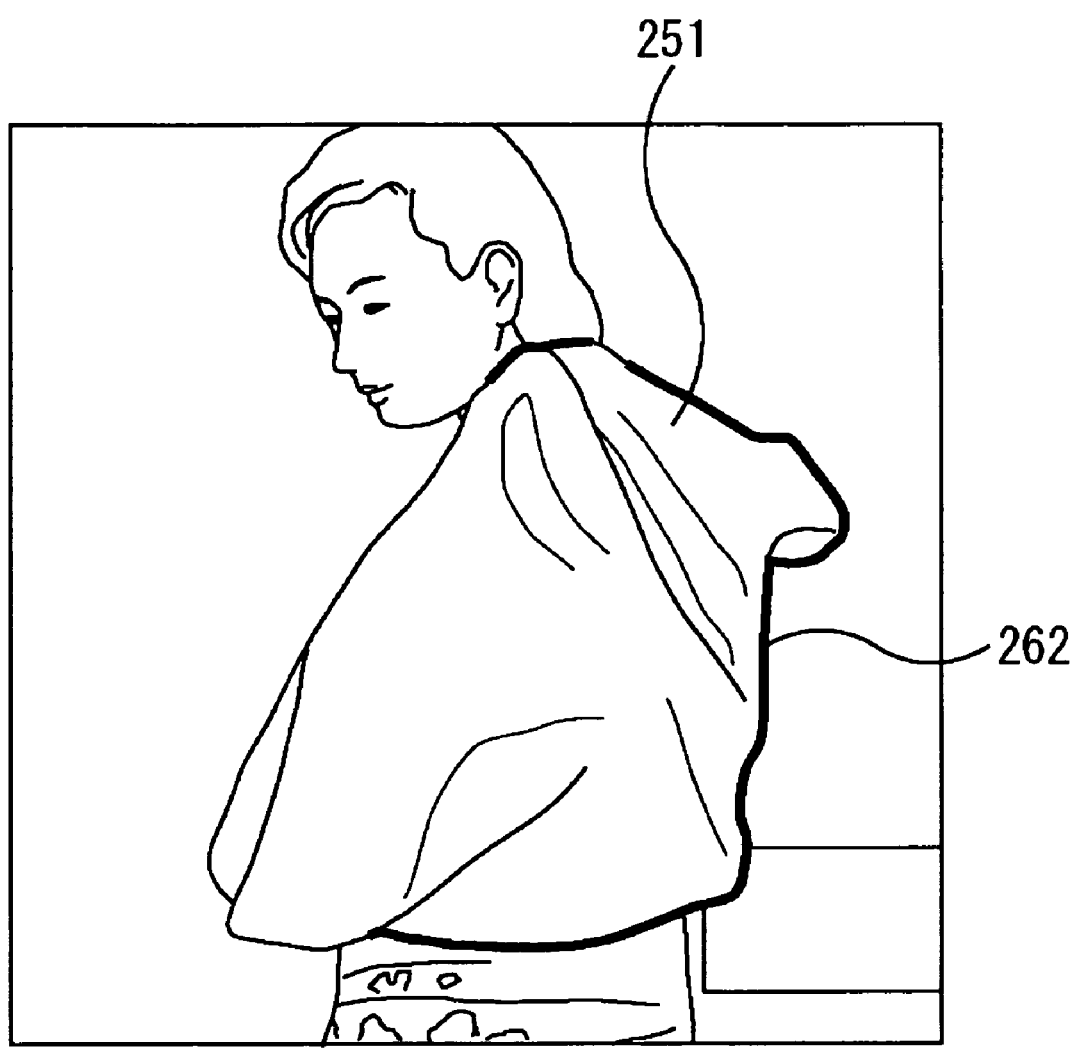
FIG. 18 is an illustration of an example in which the user inputs the contour in the image of FIG. 16.

In this example, referring to FIG. 17, the user traces the contour of the scarf 251 with the touch pen 72-1 in the highlighted portion 231 of FIG. 15, thereby inputting a bold line 261. Referring to FIG. 18, the user traces the contour of the scarf 251 with the touch pen 72-1 in the highlighted portion 232 of FIG. 16, thereby inputting a bold line 262.

As described above, an image in a frame in which the user must input the contour of an object to be extracted and a portion in which the user must input the contour are displayed. Therefore, the object can be extracted more accurately.

The experimental results of extracting the object according to the present invention will be described in comparison with the experimental results of extracting the object by two methods differing from the present invention. These two object extracting methods, differing from the present invention, include a method in which, instead of displaying a portion in which the contour must be input, the user views the contour of an object to be extracted in the first frame (frame 0) and inputs the entire contour surrounding the object, and frames of moving image data are played in the forward direction to extract the contour of the object (hereinafter referred to as method A); and a method in which, instead of displaying a portion in which the contour must be input, the user views the contour of an object to be extracted in the last frame (frame 50) and inputs the entire contour surrounding the object, and frames of moving image data are played in the backward direction to extract the contour of the object (hereinafter referred to as method B).

Figure 19:
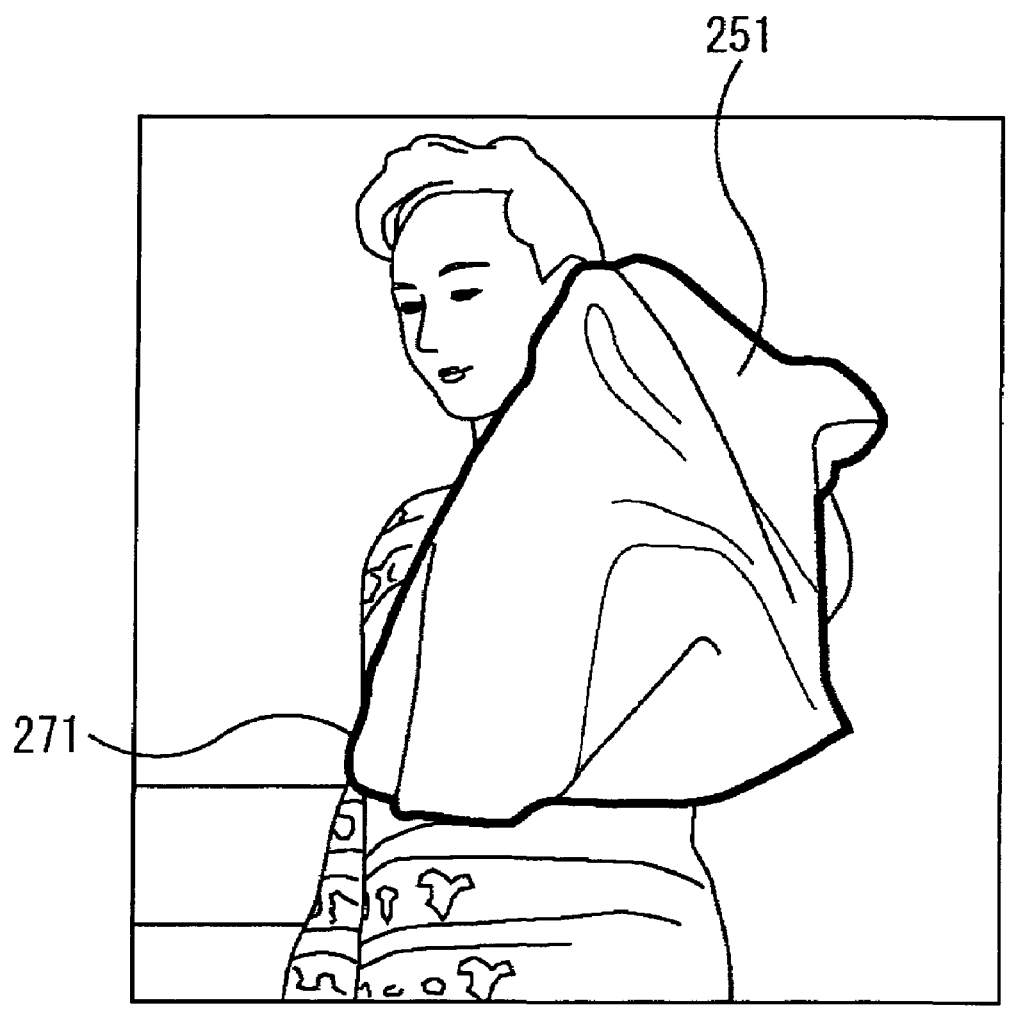
FIG. 19 is an illustration of an example of a displayed image in a frame in which the user must input the contour according to method A.
Figure 20:
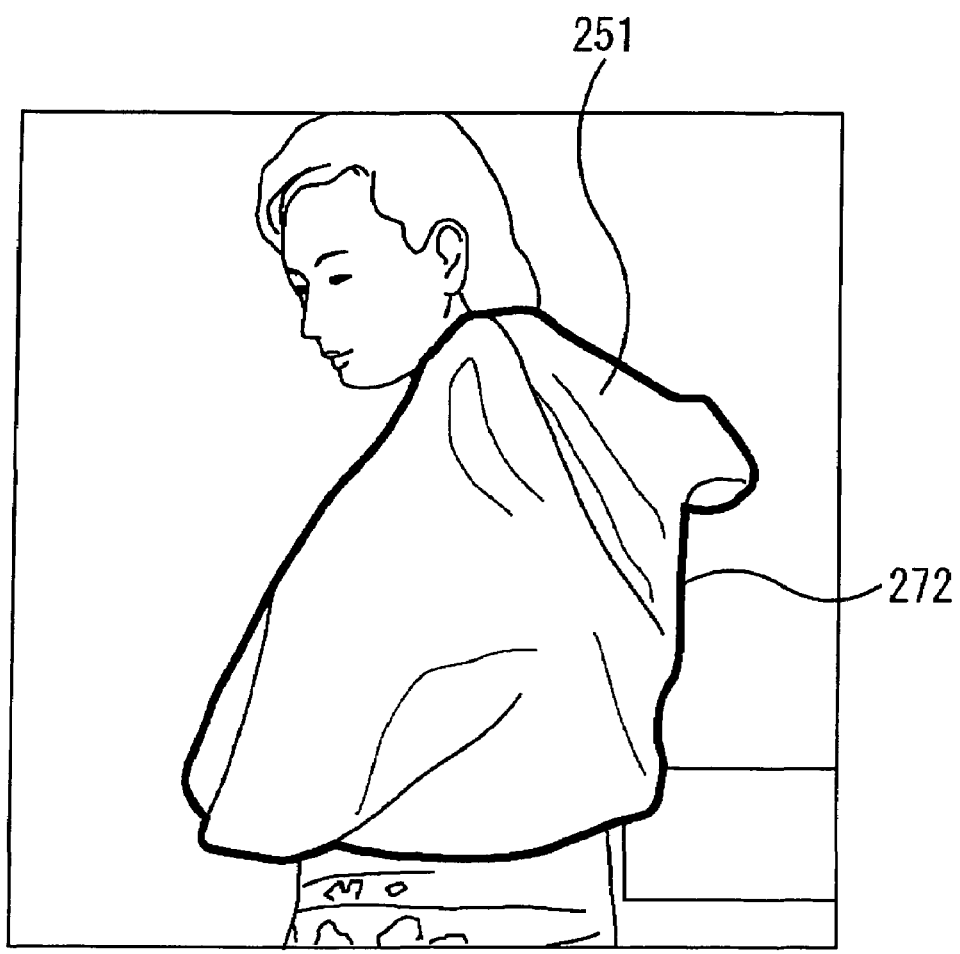
FIG. 20 is an illustration of an example of a displayed image in a frame in which the user must input the contour according to method B.

According to method A, as shown in FIG. 19, the user traces the contour of the entire scarf 251 in the first frame (frame 0), thereby inputting a line 271. According to method B, as shown in FIG. 20, the user traces the contour of the entire scarf 251 in the last frame (frame 50), thereby inputting a line 272. According to the present invention, the contour of the scarf 251 can be input by the method described with reference to FIGS. 17 and 18.

Figure 21:
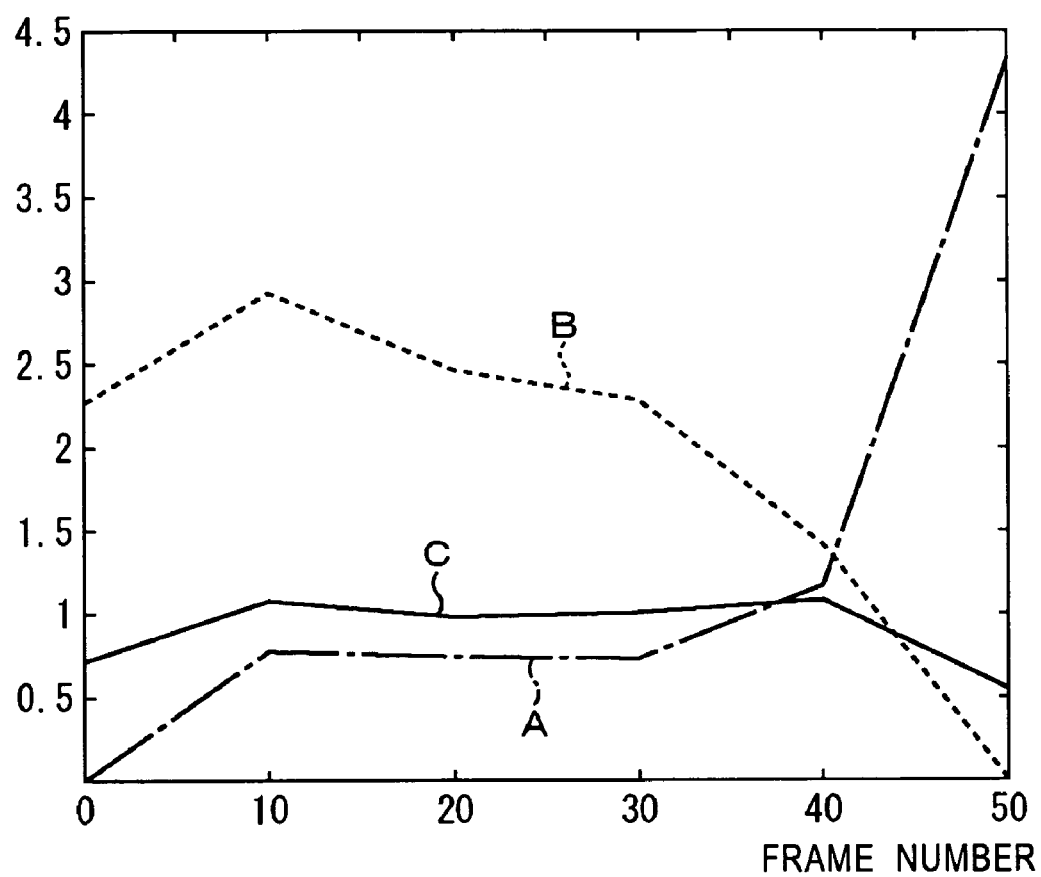
FIG. 21 is a graph for comparing estimation values of the experimental results of extracting the object according to the present invention with estimation values of the experimental results of extracting the object according to method A or method B.

FIG. 21 is a graph showing estimation values of the experimental results of extracting the object according to method A or method B and estimation values of the experimental results of extracting the object according to the present invention. Referring to FIG. 21, the frame number is given in abscissa, and the estimation value of the object extraction result is given in ordinate. In each of frames 0 to 50, the estimation value of the experimental result of extracting the object is determined by comparing the contour of the scarf 251, which is input by the user, with the contour of the object, which is extracted automatically.

Figure 22:
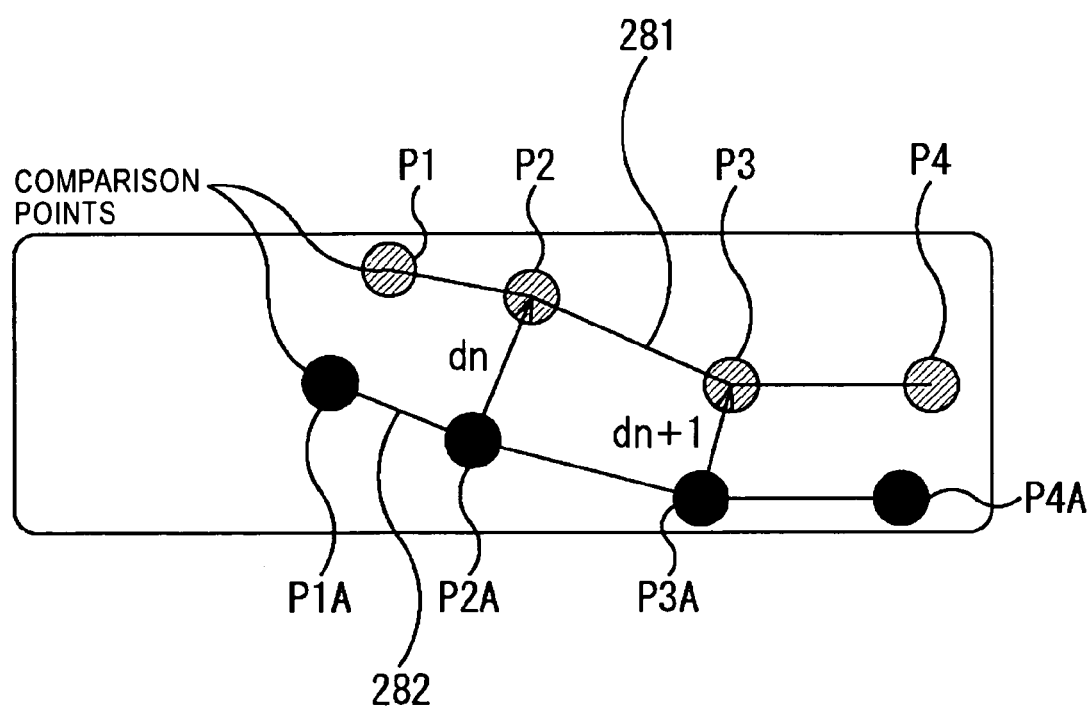
FIG. 22 is an illustration of comparison points, which are on the border of the object, for computing the estimation value.

Specifically, referring to FIG. 22, comparison points P1 to P4 are set on a border 281 of the object, which is manually input by the user. In addition, comparison points P1A to P4A, corresponding to the comparison points P1 to P4, are set on a border 282 of the object, which is extracted automatically. The distance between each two corresponding comparison points is computed. For example, dn is the distance between the comparison points P2 and P2A, and dn+1 is the distance between the comparison points P3 and P3A. Given N comparison points, as in this case, the estimation value a of the object extraction result is computed by:

$$\alpha = (1/N)\Sigma dn \quad (4)$$

The estimation value α represents the average of distances between pairs of comparison points. The smaller the estimation value α, the more accurately the object is extracted.

Referring to FIG. 21, line A represents estimation values of the experimental results of extracting the object according to method A; line B represents estimation values of the experimental results of extracting the object according to method B; and line C represents estimation values of the experimental results of extracting the object according to the present invention. Line A is slanted steeply upward in frames 40 to 50 in which the estimation value increases. Line B shows that the estimation value is small in the vicinity of frame 50, whereas the estimation values are large in frames 0 to 40.

In contrast, line C shows stable, relatively small estimation values in frames 0 to 50. In comparison with method A or method B, the experimental results of extracting the object according to the present invention demonstrate that the object is extracted stably with relatively high accuracy in the first to last frames.

Figure 23:
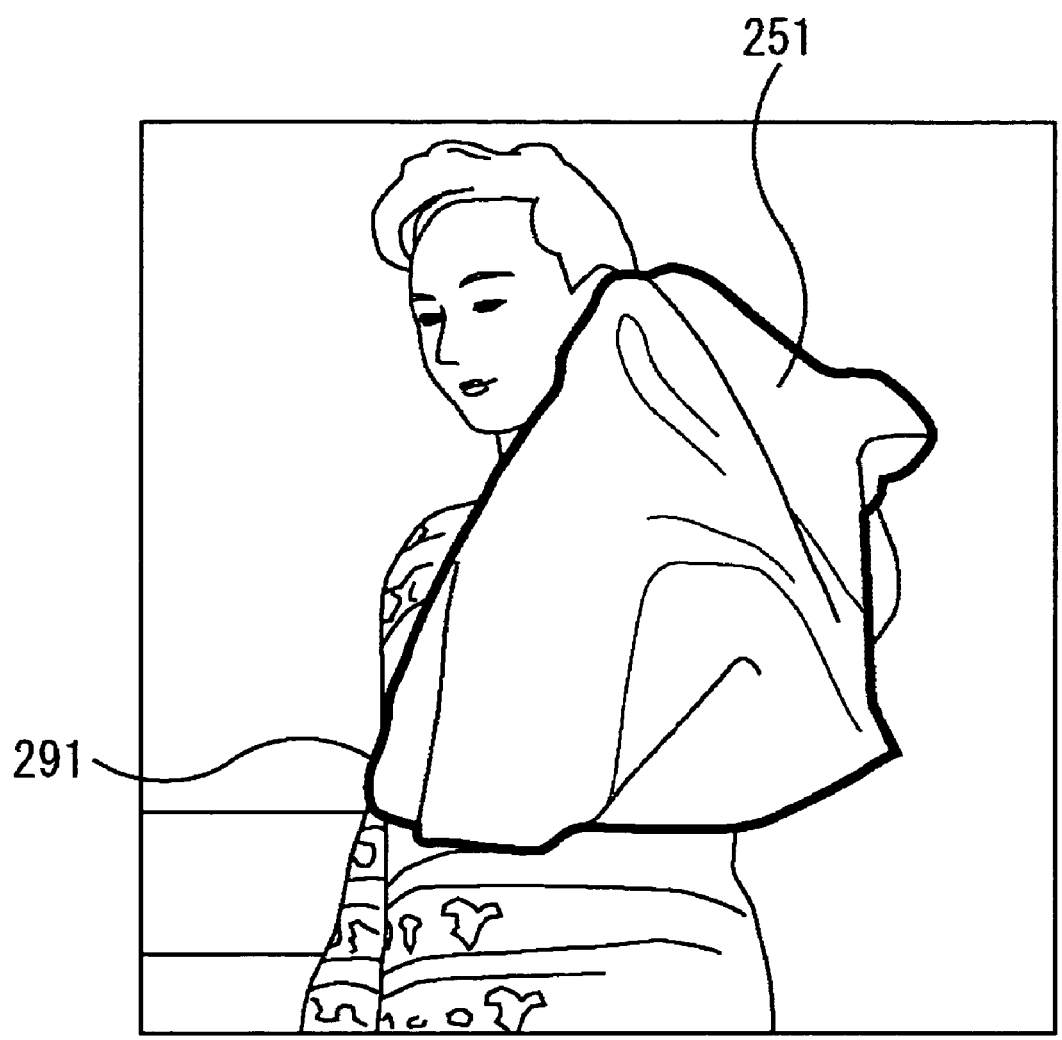
FIG. 23 is an illustration of an image in frame 0 in which the object is extracted according to the present invention.
Figure 24:
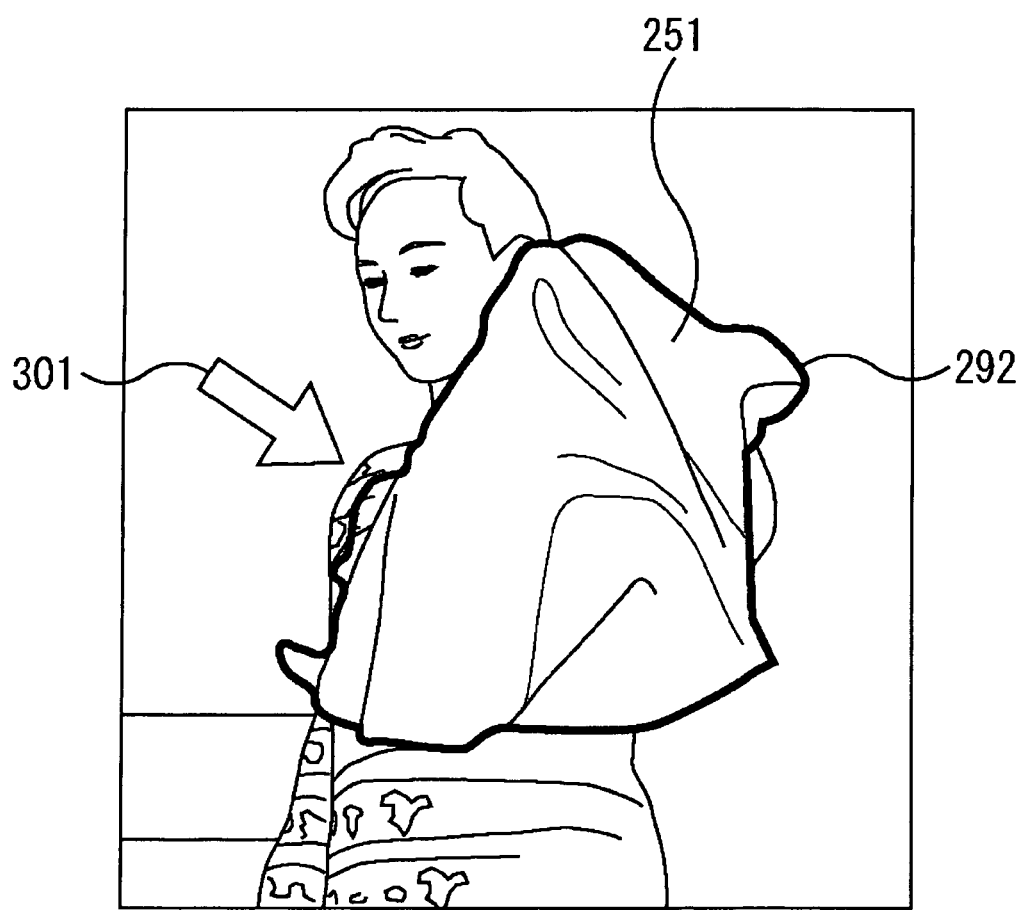
FIG. 24 is an illustration of an image in frame 0 in which the object is extracted according to method B.

Referring to FIG. 23, a line 291 represents the contour of the scarf 251 (object) in the image in frame 0, which is extracted according to the present invention. Referring to FIG. 24, a line 292 represents the contour of the scarf 251 in the image in frame 0, which is extracted according to method B.

As shown in FIG. 24, according to method B, the contour of the scarf 251 is extracted erroneously in the vicinity of an arrow 301. In contrast, as shown in FIG. 23, there are no major errors in extraction according to the present invention.

Figure 25:
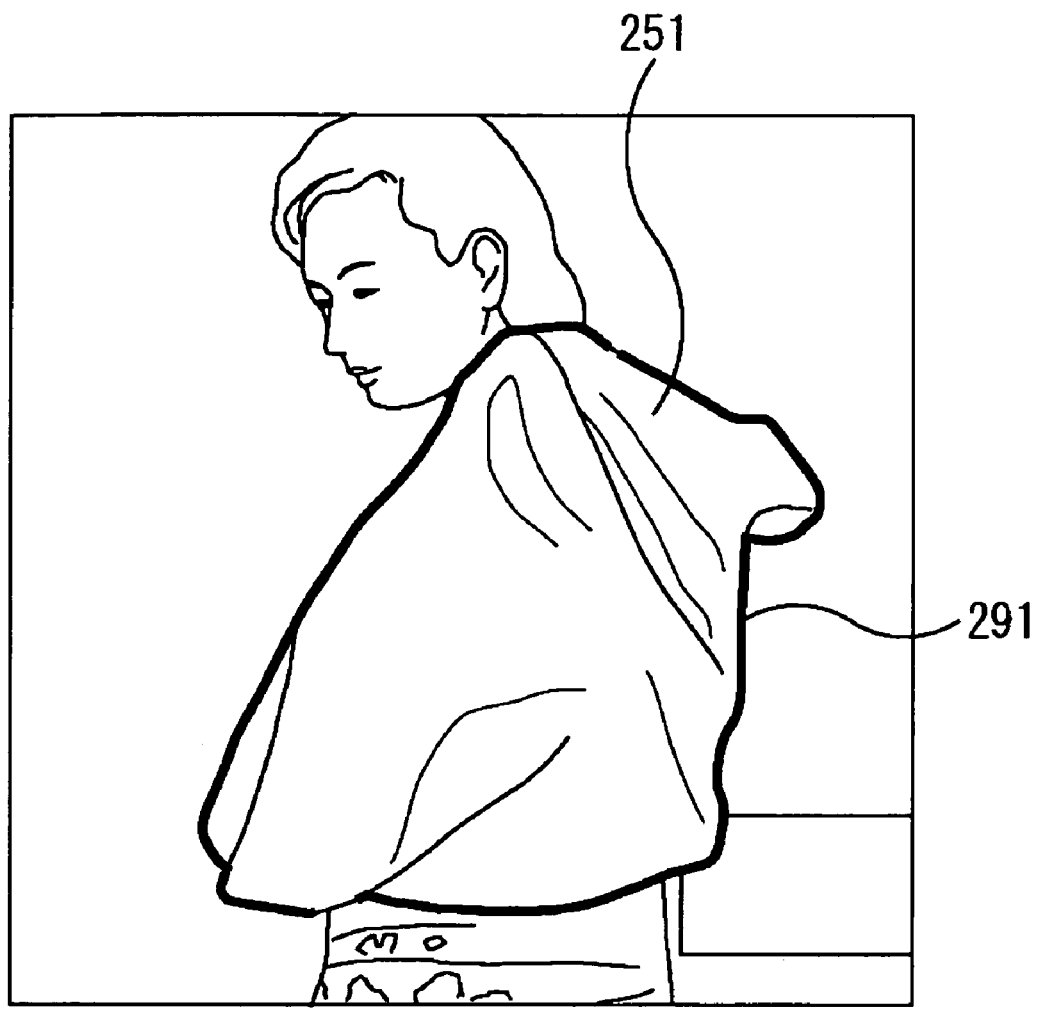
FIG. 25 is an illustration of an image in frame 50 in which the object is extracted according to the present invention.
Figure 26:
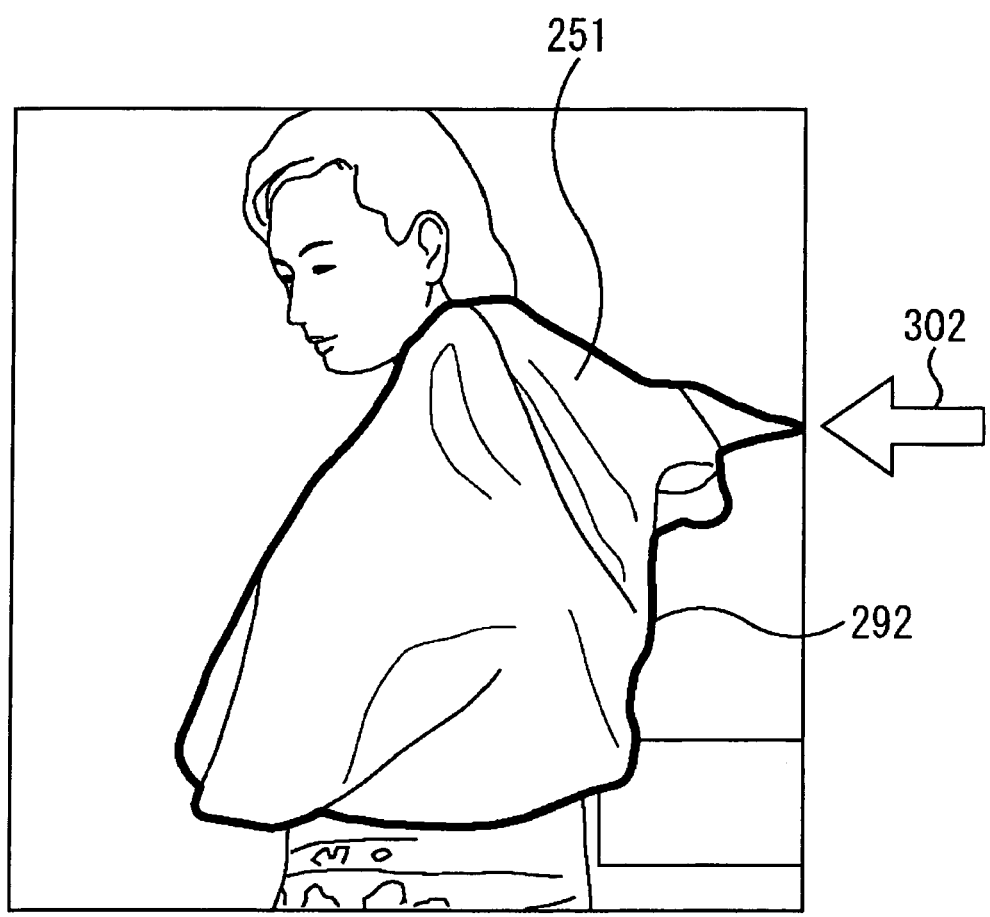
FIG. 26 is an illustration of an image in frame 50 in which the object is extracted according to method A.

Referring to FIG. 25, the line 291 represents the contour of the scarf 251 (object) in the image in frame 50, which is extracted according to the present invention. Referring to FIG. 26, the line 292 represents the contour of the scarf 251 in the image in frame 50, which is extracted according to method A. As shown in FIG. 26, according to method A, the contour of the scarf 251 is extracted erroneously in the vicinity of an arrow 302. In contrast, as shown in FIG. 25, there are no major errors in extraction according to the present invention.

Figure 27:
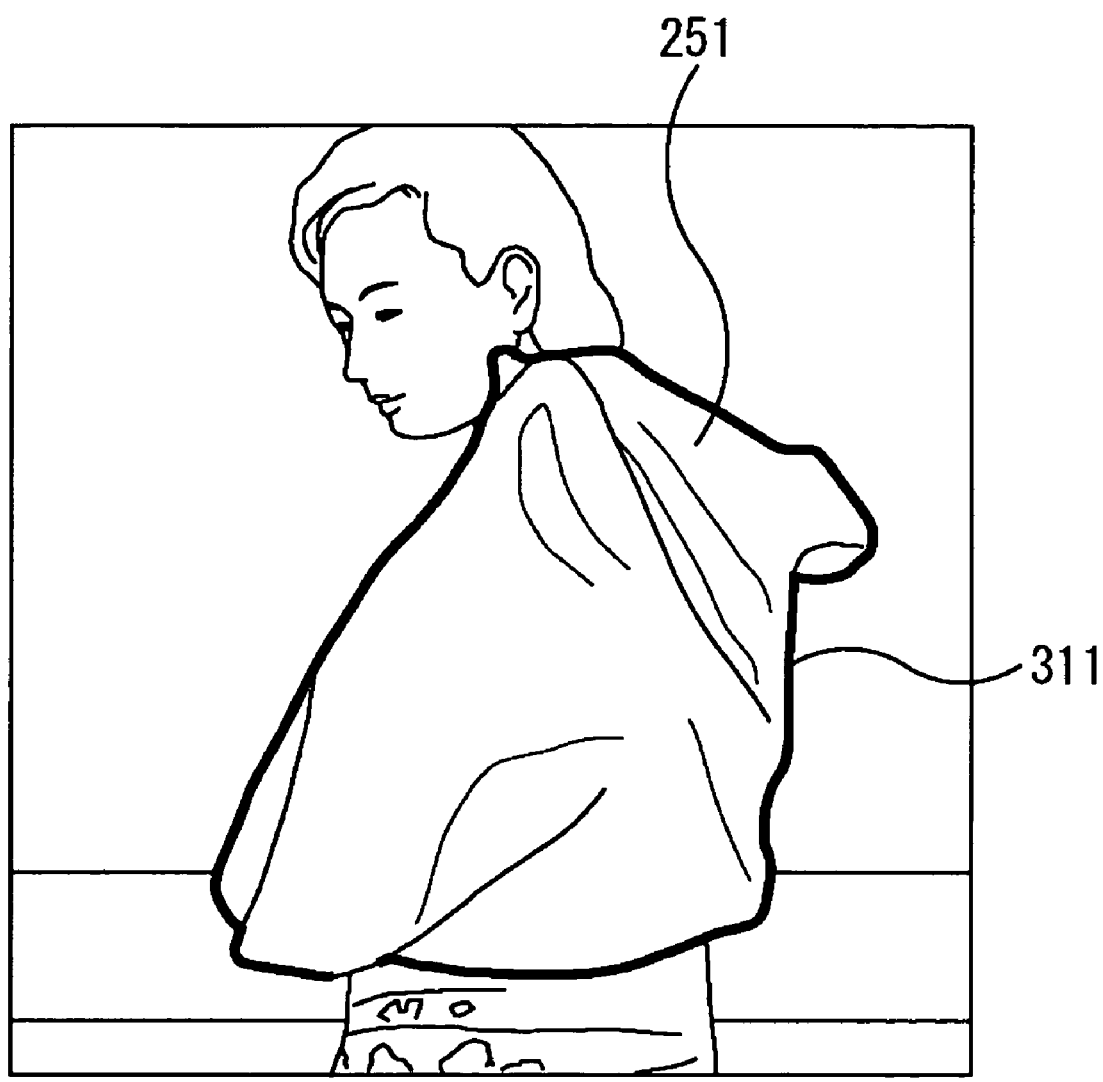
FIG. 27 is an illustration of an image in frame 40 in which the object is extracted according to the present invention.
Figure 28:
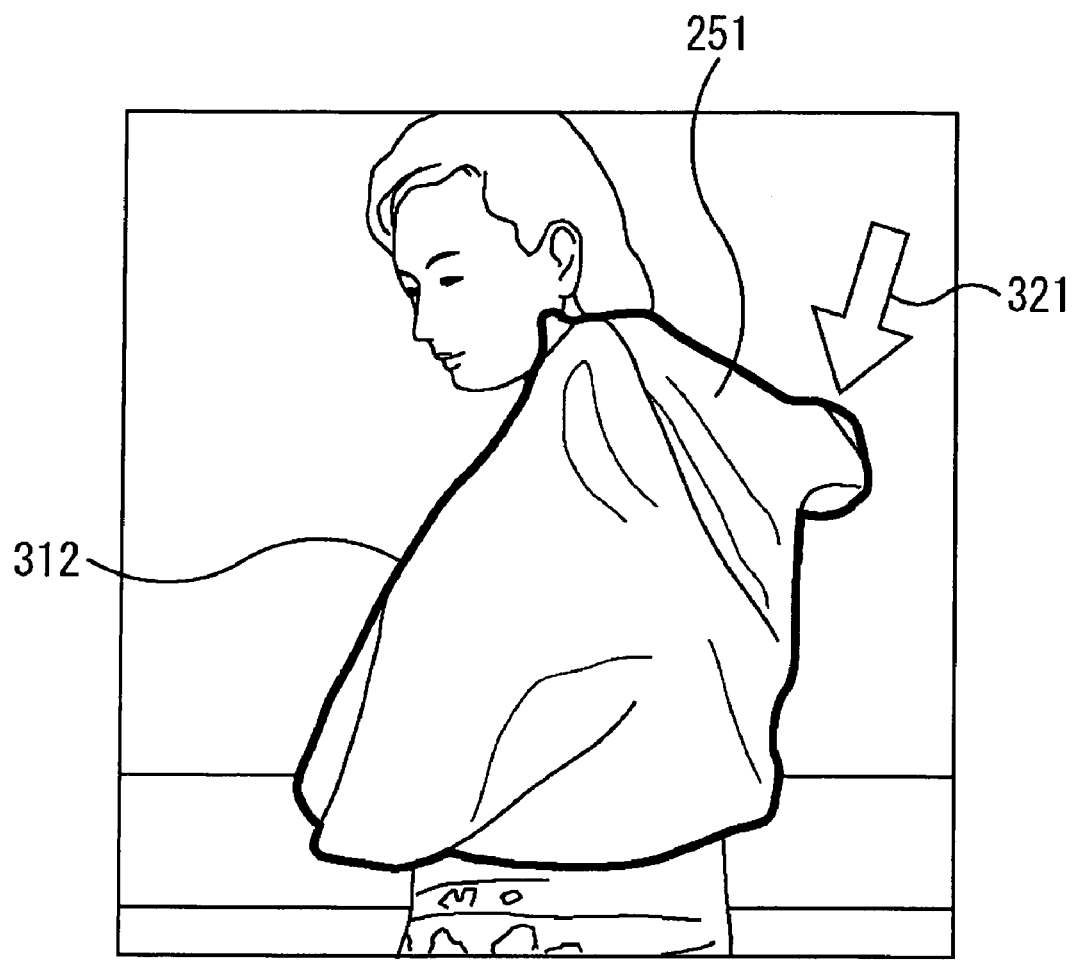
FIG. 28 is an illustration of an image in frame 40 in which the object is extracted according to method A.
Figure 29:
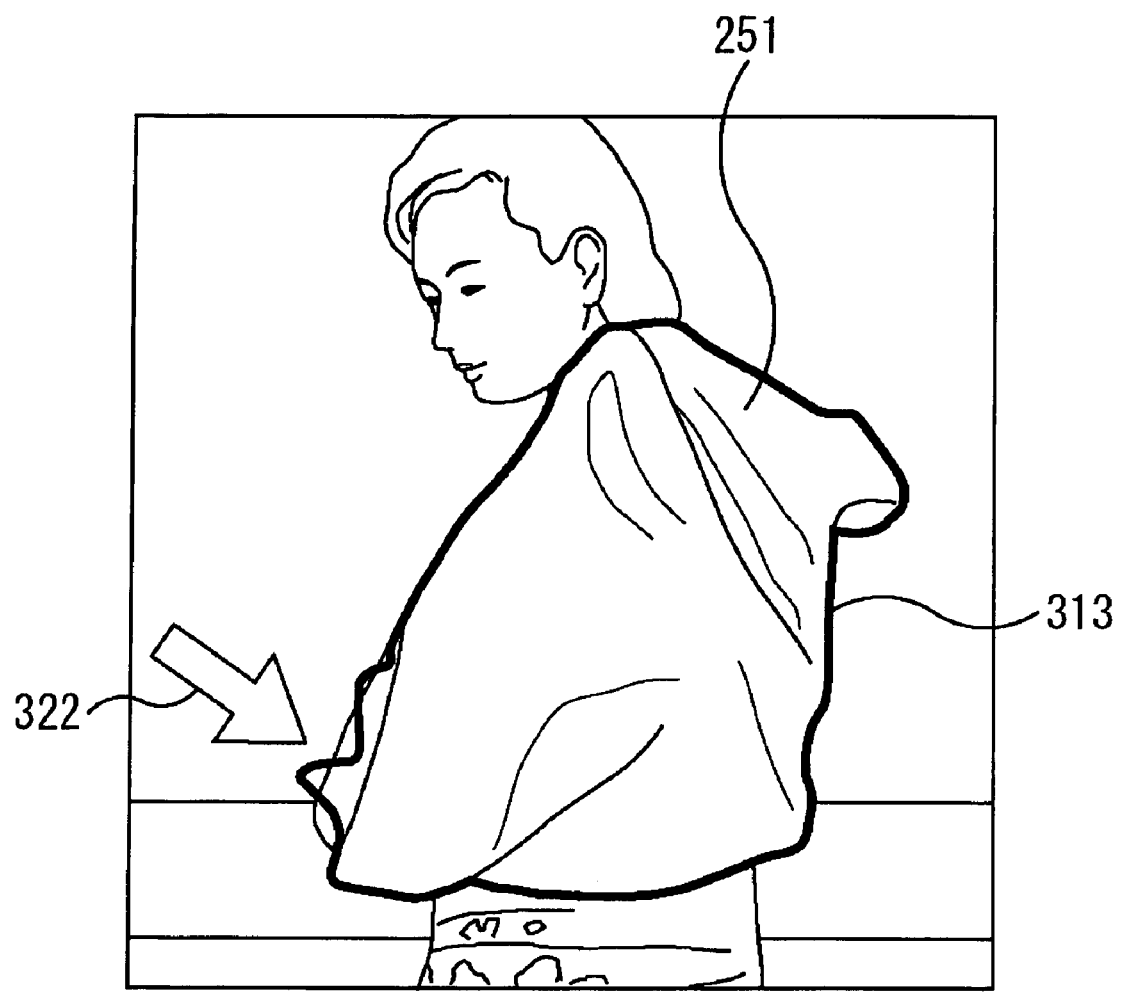
FIG. 29 is an illustration of an image in frame 40 in which the object is extracted according to method B.

Referring to FIG. 27, a line 311 represents the contour of the scarf 251 (object) in the image in frame 40, which is extracted according to the present invention. Referring to FIG. 28, a line 312 represents the contour of the scarf 251 in the image in frame 40, which is extracted according to method A. Referring to FIG. 29, a line 313 represents the contour of the scarf 251 in the image in frame 40, which is extracted according to method B. As shown in FIG. 28, according to method A, the contour of the scarf 251 is extracted erroneously in the vicinity of an arrow 321. As shown in FIG. 29, according to method B, the contour of the scarf 251 is extracted erroneously in the vicinity of an arrow 322. In contrast, as shown in FIG. 27, there are no major errors in extraction according to the present invention.

As described above, when the user is prompted to input the contour of the object in the covered background area in the first frame (frame 0) and to input the contour of the object in the uncovered background area in the last frame (frame 50), the object is extracted stably with relatively high accuracy in all frames without increasing the number of contours of the object, which must be input by the user.

A series of the foregoing processes may be performed not only by hardware, but also by software. To perform the series of the foregoing processes by software, a program constituting the software is installed from a network or a recording medium on a computer included in dedicated hardware or, for example, a general personal computer, such as that shown in FIG. 30, capable of performing various functions by installing various programs.

Figure 30:
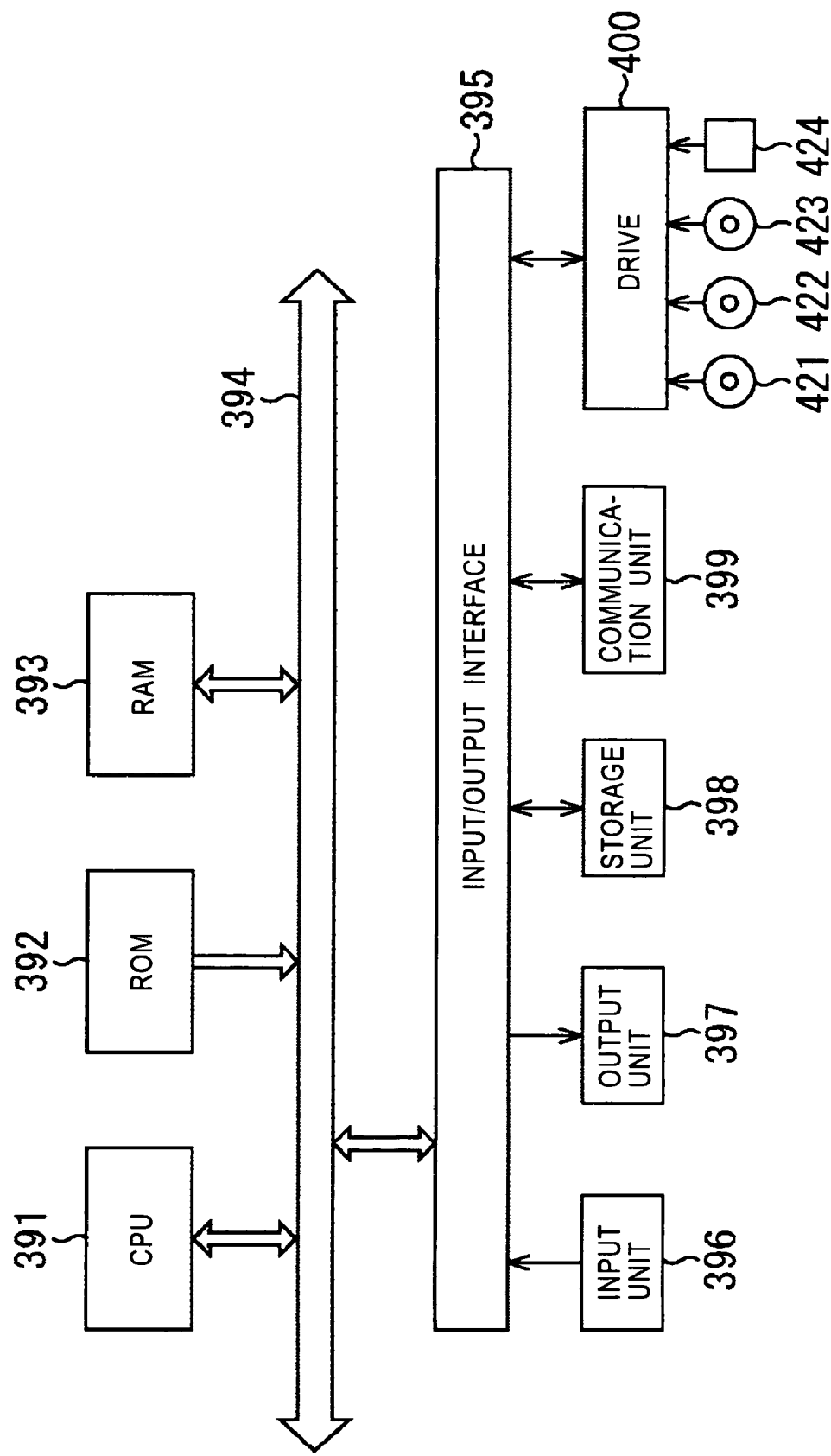
FIG. 30 is a block diagram showing an example of the structure of a personal computer.

Referring to FIG. 30, a central processing unit (CPU) 391 performs various processes in accordance with a program recorded on a read only memory (ROM) 392 or a program loaded from a storage unit 398 on a random access memory (RAM) 393. Where necessary, the RAM 393 stores necessary data for the CPU 391 to perform various processes.

The CPU 391, the ROM 392, and the RAM 393 are interconnected via a bus 394. An input/output interface 395 is connected to the bus 394.

An input unit 396 including a keyboard and a mouse, an output unit 397 including a display, such as a cathode ray tube (CRT) or a liquid crystal display (LCD), and a speaker, the storage unit 398 including a hard disk, and a communication unit 399 including a modem and a terminal adapter are connected to the input/output interface 395. The communication unit 399 performs communication via a network such as the Internet.

Where necessary, a drive 400 is connected to the input/output interface 395. A recording medium having recorded thereon a computer program according to the present invention is inserted in the drive 400. Where necessary, the computer program read from the recording medium is installed on the storage unit 398.

The recording medium may be a magnetic disk 421, an optical disk 422, a magneto-optical disk 423, or a semiconductor memory 424.

In the present specification, steps for performing the series of the foregoing processes include not only time-series processes performed in accordance with the described order, but also parallel or individual processes, which may not necessarily be performed in time series.

What is claimed is:

1. An image processing apparatus for extracting an object in an image, comprising;
   image obtaining means for obtaining image data of a specified image;
   motion analyzing means for analyzing motion of the object included in the image based on the obtained image data, including frame detecting means for detecting a first frame containing a first frame covered background area that corresponds to a background area that is gradually covered by the object due to frame-to-frame apparent movement of the object and for detecting a last frame containing a last frame uncovered background area that corresponds to a background area that gradually changes from being covered by the object to being uncovered by the object due to the apparent frame-to-frame movement of the object;
   means for prompting a user to input a first frame contour of a first subset of the contour of the object to be extracted within the first frame covered background area and to input a last frame contour of a second subset of the contour of the object to be extracted within the last frame uncovered background area, respectively, wherein the first subset differs from the second subset and neither the first subset nor the second subset includes the entire contour of the object; and
   object extracting means for extracting the object from a plurality of frames from the first frame to the last frame based on the respective first and last frame contours.

2. An image processing apparatus according to claim 1, wherein the motion analyzing means includes:
   motion computing means for computing the motion of the object in the image relative to a background; and
   area determining means for determining the first frame covered background area and the last frame uncovered background area based on the motion computed by the motion computing means.

3. An image processing apparatus according to claim 2 further comprising image presenting means for presenting an image in a frame in which the object to be extracted from the image is specified, wherein the image presenting means displays the first frame covered background area and the last frame uncovered background area.

4. An image processing apparatus according to claim 2, wherein the motion computing means includes distance computing means for setting a plurality of feature points in the image and computing distances between adjacent feature points.

5. An image processing apparatus according to claim 4, wherein the area determining means includes:
   comparison means for comparing a distance between adjacent feature points in a temporally prior frame with a distance between adjacent feature points in a temporally subsequent frame, the distances being computed by the motion computing means; and
   setting means for setting, based on a comparison result obtained by the comparison means, in the background of the image, the first frame covered background area and the last frame uncovered background area.

6. An image processing apparatus according to claim 1, further comprising object displaying means for displaying the object extracted by the object extracting means.

7. An image processing method for extracting an object in an image, comprising steps of;
   obtaining image data of a specified image;
   analyzing motion of an object included in the image based on the obtained image data, including detecting a first frame containing a first frame covered background area that corresponds to a background area that is gradually covered by the object due to frame-to-frame apparent movement of the object and detecting a last frame containing a last frame uncovered background area that corresponds to a background area that gradually changes from being covered by the object to being uncovered by the object due to the apparent frame-to-frame movement of the object;
   prompting a user to input a first frame contour of a first subset of the contour of the object to be extracted within the first frame covered background area and to input a last frame contour of a second subset of the contour of the object to be extracted within the last frame uncovered background area, respectively, wherein the first subset differs from the second subset and neither the first subset nor the second subset includes the entire contour of the object; and
   extracting the object from a plurality of frames from the first frame to the last frame based on the respective first and last frame contours.

8. A computer readable storage medium having a computer-executable program recorded thereon configured to execute a method comprising:
   obtaining image data of a specified image;
   analyzing motion of an object included in the image based on the obtained image data, including detecting a first frame containing a first frame covered background area that corresponds to a background area that is gradually covered by the object due to frame-to-frame apparent movement of the object and detecting a last frame containing a last frame uncovered background area that corresponds to a background area that gradually changes from being covered by the object to being uncovered by the object due to the apparent frame-to-frame movement of the object;
   prompting a user to input a first frame contour of a first subset of the contour of the object to be extracted within the first frame covered background area and to input a last frame contour of a second subset of the contour of the object to be extracted within the last frame uncovered background area, respectively, wherein the first subset differs from the second subset and neither the first subset nor the second subset includes the entire contour of the object; and
   extracting the object from a plurality of frames from the first frame to the last frame based on the respective first and last frame contours.

9. The method according to claim 7, wherein the analyzing step includes:
   computing the motion of the object in the image relative to a background; and
   determining the first frame covered background area and the last frame uncovered background area based on the computed motion.

10. The method according to claim 9 further comprising presenting an image in a frame in which the object to be extracted from the image is specified, wherein the image presenting step includes displaying the first frame covered background area and the last frame uncovered background area.

11. The method according to claim 9, wherein the motion computing step includes setting a plurality of feature points in the image and computing distances between adjacent feature points.

12. The method according to claim 11, wherein the area determining step includes:
   comparing a distance between adjacent feature points in a temporally prior frame with a distance between adjacent feature points in a temporally subsequent frame; and
   setting in the background of the image the first frame covered background area as-an and the last frame uncovered background area.

* * * * *